United States Patent
Song et al.

(10) Patent No.: US 10,244,289 B2
(45) Date of Patent: *Mar. 26, 2019

(54) METHOD FOR MAPPING SIGNALING INFORMATION TO ANNOUNCEMENT INFORMATION AND BROADCAST RECEIVER

(71) Applicant: LG ELECTRONICS INC., Seoul (KR)

(72) Inventors: Jae Hyung Song, Seoul (KR); Jong Yeul Suh, Seoul (KR); Chul Soo Lee, Seoul (KR); Gomer Thomas, Arlington, WA (US); Jin Pil Kim, Seoul (KR); Ho Taek Hong, Seoul (KR); Joon Hui Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/628,463

(22) Filed: Jun. 20, 2017

(65) Prior Publication Data

US 2017/0289640 A1    Oct. 5, 2017

Related U.S. Application Data

(63) Continuation of application No. 15/004,552, filed on Jan. 22, 2016, now Pat. No. 9,736,547, which is a (Continued)

(30) Foreign Application Priority Data

Jun. 9, 2009    (KR) .................. 10-2009-0051202

(51) Int. Cl.
  *H04N 21/643*  (2011.01)
  *H04N 21/438*  (2011.01)
  (Continued)

(52) U.S. Cl.
  CPC ....... *H04N 21/64322* (2013.01); *H04L 67/06* (2013.01); *H04L 69/16* (2013.01);
  (Continued)

(58) Field of Classification Search
  None
  See application file for complete search history.

(56) References Cited

U.S. PATENT DOCUMENTS 8,824,347 B2    9/2014  Pelletier et al.
2004/0153468 A1 *  8/2004  Paila ................ G06F 17/30067
  (Continued)

FOREIGN PATENT DOCUMENTS

KR    10-2007-0122026    12/2007
KR    10-2008-0005063    1/2008

OTHER PUBLICATIONS

S. Ganguly et al., "Non-Real-Time Content Scheduling Algorithms for Wireless Data Networks," IEEE Transactions on Computers, vol. 55, No. 7, pp. 893-905, Jul. 2006.

(Continued)

*Primary Examiner* — Kouroush Mohebbi
(74) *Attorney, Agent, or Firm* — Lee, Hong, Degerman, Kang & Waimey

(57) ABSTRACT

A method of providing a Non-Real-Time (NRT) service includes receiving a file configuring the NRT service, first signaling information, and second signaling information in a state of being IP-packetized and contained in a single ensemble, configuring and displaying a service guide using the first signaling information acquired from the ensemble, acquiring a first content identifier of content selected from the displayed service guide, accessing a FLUTE session using the second signaling information acquired from the ensemble and acquiring a second content identifier matched with the first content identifier from the accessed FLUTE (Continued)

session, and receiving and storing at least one file configuring the content based on the acquired second content identifier.

2 Claims, 24 Drawing Sheets

Related U.S. Application Data continuation of application No. 14/796,905, filed on Jul. 10, 2015, now Pat. No. 9,294,811, which is a continuation of application No. 13/968,239, filed on Aug. 15, 2013, now Pat. No. 9,118,975, which is a continuation of application No. 12/481,563, filed on Jun. 9, 2009, now Pat. No. 8,537,746.

(60) Provisional application No. 61/059,811, filed on Jun. 9, 2008, provisional application No. 61/079,121, filed on Jul. 8, 2008, provisional application No. 61/115,888, filed on Nov. 18, 2008, provisional application No. 61/121,178, filed on Dec. 9, 2008, provisional application No. 61/138,494, filed on Dec. 17, 2008, provisional application No. 61/153,973, filed on Feb. 20, 2009, provisional application No. 61/153,985, filed on Feb. 20, 2009, provisional application No. 61/169,711, filed on Apr. 15, 2009, provisional application No. 61/179,005, filed on May 17, 2009.

(51) Int. Cl.
*H04N 21/235* (2011.01)
*H04N 21/236* (2011.01)
*H04N 21/435* (2011.01)
*H04N 21/482* (2011.01)
*H04N 21/84* (2011.01)
*H04L 29/08* (2006.01)
*H04N 21/63* (2011.01)
*H04L 29/06* (2006.01)
*H04N 21/61* (2011.01)

(52) U.S. Cl.
CPC ..... *H04N 21/235* (2013.01); *H04N 21/23614* (2013.01); *H04N 21/435* (2013.01); *H04N 21/4382* (2013.01); *H04N 21/482* (2013.01); *H04N 21/6125* (2013.01); *H04N 21/63* (2013.01); *H04N 21/84* (2013.01)

(56) References Cited

U.S. PATENT DOCUMENTS

| 2006/0023652 | A1 | 2/2006 | Vedantham et al. |
| 2006/0059267 | A1 | 3/2006 | Cugi et al. |
| 2007/0101352 | A1* | 5/2007 | Rabina ............... H04H 60/372 725/1 |
| 2007/0268874 | A1 | 11/2007 | Vare et al. |
| 2008/0010578 | A1 | 1/2008 | Jiang |
| 2008/0186892 | A1 | 8/2008 | Damnjanovic |
| 2010/0231803 | A1 | 9/2010 | Citta et al. |
| 2011/0243048 | A1 | 10/2011 | Wang et al. |
| 2012/0036164 | A1* | 2/2012 | Jahan ............... H04N 21/23406 707/803 |
| 2013/0258919 | A1 | 10/2013 | Damnjanovic |
| 2015/0319482 | A1 | 11/2015 | Song et al. |
| 2016/0142790 | A1 | 5/2016 | Song et al. |

OTHER PUBLICATIONS

D. Gomez-Barquero et al., "Filecasting for Streaming Content Delivery in IP Datacast over DVB-H Systems," 2008 IEEE International Symposium on Broadband Multimedia Systems and Broadcasting, pp. 1-6, Jun. 2008.
European Telecommunications Standards Institute (ETSI), "Digital Video Broadcasting (DVB); IP Datacast over DVB-H: Architecture," ETSI TR 102 469, v1.1.1, May 2006, 38 pages.
Advanced Television Systems Committee (ATSC), "ATSC Standard: Delivery of IP Multicast Sessions over ATSC Data Broadcast," Doc. A/92, Jan. 2002, 42 pages.
Korean Intellectual Property Office Application No. 10-2016-0019512, Notice of Allowance dated Aug. 22, 2016, 7 pages.

* cited by examiner

FIG. 4

| | | OMA BCAST Service Guide | NRT Content Items/ Files |
|---|---|---|---|
| | | FLUTE | |
| Service protection - OMA BCAST DRM | Signaling Channel Service - SMT | ALC/ LCT | |
| UDP | | | |
| IP | | | |
| RS Frame | | | |
| M/H Physical Layer | | | |
| 8VSB Physical Layer | | | |

FIG. 11

| Syntax | No.of Bits | Format |
|---|---|---|
| service_map_table_MH_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension { | | |
|         SMT_MH_protocol_version | 8 | uimsbf |
|         ensemble_id | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     num_MH_services | 8 | uimsbf |
|     for (j=0;j< num_MH_services; j++) | | |
|     { | | |
|         MH_service_id | 16 | uimsbf |
|         multi_ensemble_service | 2 | uimsbf |
|         MH_service_status | 2 | uimsbf |
|         SP_indicator | 1 | bslbf |
|         short_MH_service_name_length /* m */ | 3 | uimsbf |
|         short_MH_service_name | 16*m | |
|         reserved | 2 | '11' |
|         MH_service_category | 6 | uimsbf |
|         num_components | 5 | uimsbf |
|         IP_version_flag | 1 | bslbf |
|         source_IP_address_flag | 1 | bslbf |
|         MH_service_destination_IP_address_flag | 1 | bslbf |
|         if(source_IP_address_flag) | | |
|             source_IP_address | 32 or 128 | uimsbf |
|         if (MH_service_destination_IP_address_flag) | | |
|             MH_service_destination_IP_address | 32 or 128 | uimsbf |
|         for (j=0;j< num_components; j++) | | |
|         { | | |
|             reserved | 1 | '1' |
|             essential_component_indicator | 1 | bslbf |
|             component_destination_IP_address_flag | 1 | bslbf |
|             port_num_count | 5 | uimsbf |
|             component_destination_UDP_port_num | 16 | uimsbf |
|             if (component_destination_IP_address_flag) | | |
|                 component_destination_IP_address | 32 or 128 | uimsbf |
|             reserved | 4 | '1111' |

FIG. 12

| | | |
|---|---|---|
| num_component_level_descriptors<br>for (k=0;k< num_components_level_descriptors; k++)<br>{<br>    component_level_descriptor()<br>}<br>}<br>reserved<br>num_MH_service_level_descriptors<br>for (m=0; m<num_MH_service_level_descriptors; m++)<br>{<br>    MH_service_level_descriptor()<br>}<br>}<br>reserved<br>num_ensemble_level_descriptors<br>for (n=0; n<num_ensemble_level_descriptors; n++) {<br>{<br>    ensemble_level_descriptor()<br>}<br>}<br>} | 4<br><br><br>var<br><br><br>4<br>4<br><br><br>var<br><br><br>4<br>4<br><br>var | uimsbf<br><br><br><br><br><br>'1111'<br>uimsbf<br><br><br><br><br><br>'1111'<br>uimsbf<br><br> |

FIG. 14

| Syntax | No.of Bits | Format |
|---|---|---|
| MH_component_descriptor() { | | |
|    descriptor_tag | 8 | 0 x CB |
|    descriptor_length | 8 | uimsbf |
|    component_type | 7 | uimsbf |
|    component_encryption_flag | 1 | |
|    if (component_encryption_flag == '1') { | | |
|      num_STKM_streams | 8 | uimsbf |
|      for (i=0; i<num_STKM_streams; i++) { | | |
|         STKM_stream_id | 8 | uimsbf |
|      } | | |
|    MH_component_ data(component_type) | var | |
| } | | |

FIG. 15

| Syntax | No.of Bits | Format |
|---|---|---|
| NRT_component_data() { | | |
|    TSI | 16 | uimsbf |
|    session_start_time | 32 | uimsbf |
|    session_end_time | 32 | uimsbf |
|    reserved | 5 | '11111' |
|    tias_bandwidth_indicator | 1 | bslbf |
|    as_bandwidth_indicator | 1 | bslbf |
|    FEC_OTI_indicator | 1 | bslbf |
|    if (tias_bandwidth_indicator == '1') { | | |
|       tias_bandwidth | 16 | uimsbf |
|    } | | |
|    if (as_bandwidth_indicator == '1') { | | |
|       as_bandwidth | 16 | uimsbf |
|    } | | |
|    if (FEC_OTI_indicator == '1') { | | |
|     FEC_encoding_id | 8 | uimsbf |
|     FEC_instance_id | 16 | uimsbf |
|    } | | |
| } | | |

FIG. 17

```xml
<?xml version="1.0" encoding="UTF-8"?>
<xs:schema xmlns="urn:atsc:nrt:flute:fdt:2009" xmlns:xs="http://www.w3.org/2001/XMLSchema"
targetNamespace="urn:atsc:nrt:flute:fdt:2009" elementFormDefault="qualified">
  <xs:element name="FDT-Instance" type="FDT-InstanceType"/>
  <xs:complexType name="FDT-InstanceType">
    <xs:sequence>
      <xs:element name="File" type="File-Type" maxOccurs="unbounded"/>
      <xs:element name="FDT-Content-ID" type="xs:usignedShort" minOccurs="0" maxOccurs="unbounded"/>   ①
        <xs:any namespace="##other" processContents="skip" minOccurs="0" maxOccurs="unbounded"/>
    </xs:sequence>
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="File-Type">
    <xs:sequence>
     <xs:element name="File-Content-ID" type="Content-ID-Type" minOccurs="0" maxOccurs="unbounded"/>   ②
       <xs:any namespace="##other" processContents="skip" minOccurs="0" maxOccurs="unbounded"/>
    </xs:sequence>
    <xs:attribute name="Content-Location" type="xs:anyURI" use="required"/>
    <xs:attribute name="TOI" type="xs:positiveInteger" use="required"/>
    <xs:attribute name="Content-Length" type="xs:unsignedLong" use="required"/>
    <xs:attribute name="Transfer-Length" type="xs:unsignedLong" use="optional"/>
    <xs:attribute name="Content-Type" type="xs:string" use="optional"/>
    <xs:attribute name="Content-Encoding" type="xs:string" use="optional"/>
    <xs:attribute name="Content-MD5" type="xs:base64Binary" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="Content-ID-Type">
    <xs:attribute name="Content-ID" type="xs:unsingedShort" use="required"/>
    <xs:attribute name="entry" type="xs:boolean" default="false" use="optional"/>   ③
    <xs:anyAttribute processContents="skip"/>
  </xs:complexType>
</xs:schema>
```

FIG. 18

```xml
<?xml version="1.0" encoding="UTF-8"?>
<xs:schema xmlns="urn:atsc:nrt:flute:fdt:2009" xmlns:xs="http://www.w3.org/2001/XMLSchema"
targetNamespace="urn:atsc:nrt:flute:fdt:2009" elementFormDefault="qualified">
  <xs:element name="FDT-Instance" type="FDT-InstanceType"/>
  <xs:complexType name="FDT-InstanceType">
    <xs:sequence>
      <xs:element name="File" type="File-Type" maxOccurs="unbounded"/>
      <xs:element name="FDT-Content-ID" type="FDT-Content-ID-Type" minOccurs="0" maxOccurs="unbounded"/> ①
      <xs:any namespace="##other" processContents="skip" minOccurs="0" maxOccurs="unbounded"/>
    </xs:sequence>
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="File-Type">
    <xs:sequence>
      <xs:element name="File-Content-ID" type="Content-ID-Type" minOccurs="0" maxOccurs="unbounded"/>
      <xs:any namespace="##other" processContents="skip" minOccurs="0" maxOccurs="unbounded"/>
    </xs:sequence>
    <xs:attribute name="Content-Location" type="xs:anyURI" use="required"/>
    <xs:attribute name="TOI" type="xs:positiveInteger" use="required"/>
    <xs:attribute name="Content-Length" type="xs:unsignedLong" use="required"/>
    <xs:attribute name="Transfer-Length" type="xs:unsignedLong" use="optional"/>
    <xs:attribute name="Content-Type" type="xs:string" use="optional"/>
    <xs:attribute name="Content-Encoding" type="xs:string" use="optional"/>
    <xs:attribute name="Content-MD5" type="xs:base64Binary" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="FDT-Content-ID-Type"> ②
    <xs:sequence>
      <xs:element name="Entry-Content-Location" type="xs:anyURI" minOccurs="0" maxOccurs="unbounded"/>
    </xs:sequence>
    <xs:attribute name="Content-ID" type="xs:unsingedShort" use="required"/>
    <xs:anyAttribute processContents="skip"/>
  </xs:complexType>
  <xs:complexType name="Content-ID-Type">
    <xs:attribute name="Content-ID" type="xs:unsingedShort" use="required"/>
    <xs:attribute name="entry" type="xs:boolean" default="false" use="optional"/>
    <xs:anyAttribute processContents="skip"/>
  </xs:complexType>
</xs:schema>
```

METHOD FOR MAPPING SIGNALING INFORMATION TO ANNOUNCEMENT INFORMATION AND BROADCAST RECEIVER

CROSS REFERENCE TO RELATED APPLICATIONS

This application is a continuation of U.S. application Ser. No. 15/004,552, filed on Jan. 22, 2016, now U.S. Pat. No. 9,736,547, which is a continuation of U.S. application Ser. No. 14/796,905, filed on Jul. 10, 2015, now U.S. Pat. No. 9,294,811, which is a continuation of U.S. application Ser. No. 13/968,239, filed on Aug. 15, 2013, now U.S. Pat. No. 9,118,975, which is a continuation of U.S. application Ser. No. 12/481,563, filed Jun. 9, 2009, now U.S. Pat. No. 8,537,746, which claims the benefit of earlier filing date and right of priority to Korean Pat. Application No. 10-2009-0051202, filed on Jun. 9, 2009, and also claims the benefit of U.S. Provisional Application Nos. 61/059,811, filed on Jun. 9, 2008, 61/079,121, filed on Jul. 8, 2008, 61/115,888, filed on Nov. 18, 2008, 61/121,178, filed on Dec. 9, 2008, 61/138,494, filed on Dec. 17, 2008, 61/153,973, filed on Feb. 20, 2009, 61/153,985, filed on Feb. 20, 2009, 61/169,711, filed on Apr. 15, 2009, and 61/179,005, filed on May 17, 2009, the contents of all of which are hereby incorporated by reference herein in their entireties.

FIELD OF THE INVENTION

The present invention relates to a signaling method for a service type of a service transmitted by non-real time (hereinafter abbreviated NRT) and detailed information on the service through a terrestrial broadcast network and an operation of an NRT receiver for receiving to process the corresponding information, and more particularly, to a broadcast receiver and a method of mapping signaling information for an NRT service to announcement information therein. Although the present invention is suitable for a wide scope of applications, it is particularly suitable for the receiver to obtain additional information on the corresponding NRT service using the service relevant signaling information, determine how to process and output the corresponding service to a user and determine an operation of an associated application module.

DISCUSSION OF THE RELATED ART

Generally, an NRT (non-real time service) is one of powerful applications that will be utilized for future DTV services. The NRT is accompanied by non-real time transmission (not real-time streaming), storage and viewing operations and transmits a content of a file type on a surplus bandwidth via a broadcast medium such as terrestrial and the like. And, it is expected that the NRT will be implemented various kinds of service functions including push VOD, targeted advertising and the like.

SUMMARY OF THE INVENTION

Accordingly, the present invention is directed to a broadcast receiver and a method of mapping signaling information to announcement information therein that substantially obviate one or more problems due to limitations and disadvantages of the related art.

An object of the present invention is to provide a broadcast receiver and a method of mapping signaling information to announcement information, wherein the signaling data for an NRT service can be defined.

Another object of the present invention is to provide a broadcast receiver and a method of mapping signaling information to announcement information, wherein a scheme for transmitting the above-defined signaling data can be defined.

Another object of the present invention is to provide a broadcast receiver and a method of mapping signaling information to announcement information, wherein an NRT service is accessible in a manner that the receiver receives and process signaling data for the transmitted NRT service.

Another object of the present invention is to provide a method of mapping a content identifier of the signaling data to an identifier of a selected and transmitted content in a receiver.

A further object of the present invention is to provide a method of receiving and processing a content selected from a service guide configured by using the signaling data in the receiver, which can provide the processed content to a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of providing a Non-Real-Time (NRT) service includes receiving a file configuring the NRT service, first signaling information and second signaling information encapsulated with an IP packet and contained in a single ensemble, configuring and displaying a service guide using the first signaling information acquired from the ensemble, acquiring a first content identifier of a content selected from the displayed service guide, accessing a FLUTE session using the second signaling information acquired from the ensemble and acquiring a second content identifier matched with the first content identifier, and receiving and storing at least one file configuring the content based on the acquired second content identifier.

The method may further include receiving Fast Information Channel (FIC) data containing cross layer information for acquiring the NRT service and Transport Parameter Channel (TPC) data containing FIC version information for identifying the update of the FIC.

The FIC data may contain an ensemble identifier and a transport stream identifier.

The second signaling information may be received in a state of being encapsulated by a User Datagram Protocol/Internet Protocol (UDP/IP) header having a predetermined IP address and UDP port number.

A slot corresponding to the ensemble may be received according to a time slicing scheme.

The first signaling information may be an Open Mobile Alliance (OMA) Mobile Broadcast Services Enabler Suite (BCAST) Service Guide (SG), and the second signaling information may be a Service Map Table (SMT).

The acquired first content identifier may contain global-ContentID of the content or a content identifier which is separately defined in association with the NRT service.

The acquired first content identifier may be mapped based on the acquired second content identifier, and the second content identifier may be a 16-bit binary number.

The transport stream identifier in the received FIC and the service identifier in the received second signaling information may be combined so as to be converted into a specific type, and mapping may be performed based on the service identifier in the first signaling information.

In another aspect of the present invention, a mobile broadcast receiver include a baseband processor receiving a single ensemble including a file configuring a Non-Real-Time (NRT) service, first signaling information and second signaling information encapsulated with an IP packet, a first handler acquiring the first signaling information from the received ensemble and configuring and displaying a service guide using the acquired first signaling information, a second handler acquiring a first content identifier of a content selected from the displayed service guide, a third handler acquiring the second signaling information from the ensemble, accessing a FLUTE session using the acquired second signaling information, and acquiring a second content identifier matched with the first content identifier, a controller controlling at least one file configuring the content to be received based on the acquired second content identifier, and a storage storing the received at least one file.

Fast Information Channel (FIC) data containing cross layer information for acquiring the NRT service and Transport Parameter Channel (TPC) data containing FIC version information for identifying the update of the FIC may be received.

The FIC data may contain an ensemble identifier and a transport stream identifier.

The second signaling information may be received in a state of being encapsulated by a User Datagram Protocol/Internet Protocol (UDP/IP) header having a predetermined IP address and UDP port number.

A slot corresponding to the ensemble may be received according to a time slicing scheme.

The first signaling information may be an Open Mobile Alliance (OMA) Mobile Broadcast Services Enabler Suite (BCAST) Service Guide (SG), and the second signaling information may be a Service Map Table (SMT).

The acquired first content identifier may contain global-ContentID of the content and a content identifier which is separately defined in association with the NRT service.

The transport stream identifier in the received FIC and the service identifier in the received second signaling information may be combined so as to be converted into a specific type, and mapping is performed based on the service identifier in the first signaling information.

Accordingly, the present invention provides the following effects and/or advantages.

First of all, a transmitting side is able to include signaling data to enable an NRT service, which is provided by a receiver, to be properly recognized, received and processed.

Secondly, the receiver is able to receive, process and provide the received NRT service to a user using the transmitted signaling data.

Thirdly, the receiver is able to configure and provide a service guide to a user using the transmitted signaling data.

Fourthly, the receiver is able to receive and process content selected from the above-configured service guide accurately using signaling information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram for a protocol stack of a mobile NRT service configured according to an embodiment of the present invention

FIGS. 11 and 12 are views showing the bit stream syntax of an SMT configured according to an embodiment of the present invention;

FIG. 14 is a view explaining the bit stream syntax of an NRT component descriptor configured according to an embodiment of the present invention;

FIG. 15 is a view explaining the bit stream syntax of NRT_component_data when a component type value is 38 in the NRT component descriptor of FIG. 14;

FIG. 17 is a view explaining a File Description Table (FDT) schema for mapping a file to content_id according to an embodiment of the present invention;

FIG. 18 is a view explaining an FDT schema for mapping a file to content_id according to another embodiment of the present invention;

DETAILED DESCRIPTION OF THE INVENTION

Figure 1:
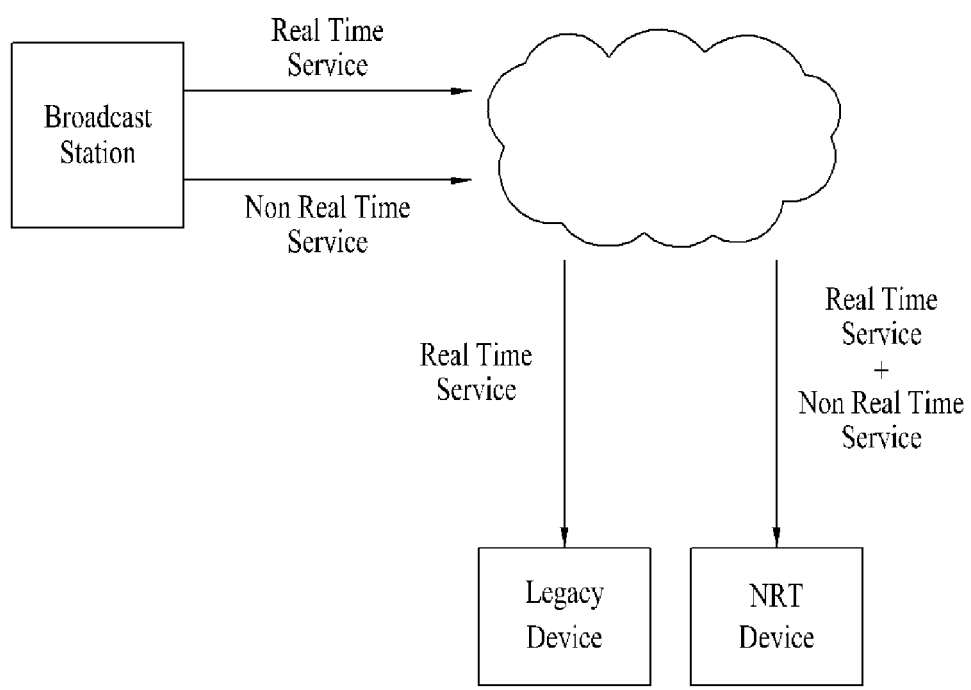
FIG. 1 is an exemplary conceptual diagram of an Non-Real-Time (NRT) service.

Reference will now be made in detail to the preferred embodiments of the present invention, examples of which are illustrated in the accompanying drawings. Wherever possible, the same reference numbers will be used throughout the drawings to refer to the same or like parts.

Definitions of Terminologies Used for the Invention

Terminologies used for the present invention are selected from general terminologies, which are currently and widely used, in consideration of functions in the present invention but may vary according to intentions of a person having an ordinary knowledge in the technical field, practices or the advent of new technology, etc. In specific case, a terminology may be arbitrarily chosen by the applicant(s). In this case, its detailed meaning shall be described in Detailed Description of Invention. Therefore, the terminology used for the present invention needs to be defined based on the intrinsic meaning of the terminology and the contents across the present invention instead of a simple name of the terminology.

Among the terms used in the description of the present invention, main service data correspond to data that can be received by a fixed receiving system and may include audio/video (A/V) data. More specifically, the main service data may include A/V data of high definition (HD) or standard definition (SD) levels and may also include diverse data types required for data broadcasting. Also, the known data correspond to data pre-known in accordance with a pre-arranged agreement between the receiving system and the transmitting system.

Additionally, among the terms used in the present invention, "M/H" (or MH) corresponds to the initials of "mobile" and "handheld" and represents the opposite concept of a fixed-type system. Furthermore, the M/H service data may include at least one of mobile service data, and handheld service data, and will also be referred to as "mobile service data" for simplicity. Thereafter, the M/H, MH, and mobile are used as the same meaning. Herein, the mobile service data not only correspond to M/H service data but may also include any type of service data with mobile or portable characteristics. Therefore, the mobile service data according to the present invention are not limited only to the M/H service data.

The above-described mobile service data may correspond to data having information, such as program execution files, stock information, and so on, and may also correspond to A/V data. Most particularly, the mobile service data may correspond to A/V data having lower resolution and lower data rate as compared to the main service data. For example, if an A/V codec that is used for a conventional main service corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information or non-real time (NRT) service data may be transmitted as the main service data.

Also, a data service using the mobile service data may include weather forecast services, traffic information services, stock information services, viewer participation quiz programs, real-time polls and surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above.

A transmission system of the present invention can multiplex and transmit mobile service data containing an NRT service and main service data in the same or different physical channels, without influencing the reception of main service data by an existing reception system (backward compatibility).

Furthermore, the transmitting system according to the present invention performs additional encoding on the mobile service data and inserts the data already known by the receiving system and transmitting system (e.g., known data), thereby transmitting the processed data.

Therefore, when using the transmitting system according to the present invention, the receiving system may receive the mobile service data during a mobile state and may also receive the mobile service data including an NRT service with stability despite various distortion and noise occurring within the channel.

A Conceptual Diagram of an NRT Service

FIG. 1 is an exemplary conceptual diagram for an NRT service.

First of all, a broadcasting station transmits an RT (real time) service according to a conventional method. In doing so, the broadcasting station transmits the RT service or an NRT (non-real time) service using a bandwidth left in the due course. In this case, the NRT service can contain a news clip, weather information, advertisements, content for Push VOD (video on demand), etc.

Yet, a related art DTV receiver, i.e., a legacy device has the principle that the operation is not affected by an NRT stream included within a channel. However, the related art DTV receiver has a problem in receiving and processing an NRT service provided by a broadcasting station properly.

On the contrary, a broadcast receiver according to the present invention, i.e., an NRT device is able to properly receive and process an NRT service combined with an RT service, thereby providing a viewer with more various functions than those of the related art DTV.

In this case, the RT service and the NRT service are transmitted on the same DTV channel or different DTV channels and are transmitted through MPEG-2 TP (transport packet) or IP datagram. Hence, a receiver needs to identify the two kinds of services transmitted on the same channel. For this, this specification discloses a method of defining and providing signaling information to enable a receiver to receive and process an NRT service properly. In this case, a broadcasting station provides signaling information via PSI/PSIP (program specific information/program and system information protocol). Specifically, at least one unique PID (packet identifier) for identifying an NRT service can be allocated.

A Receiving System

Figure 2:
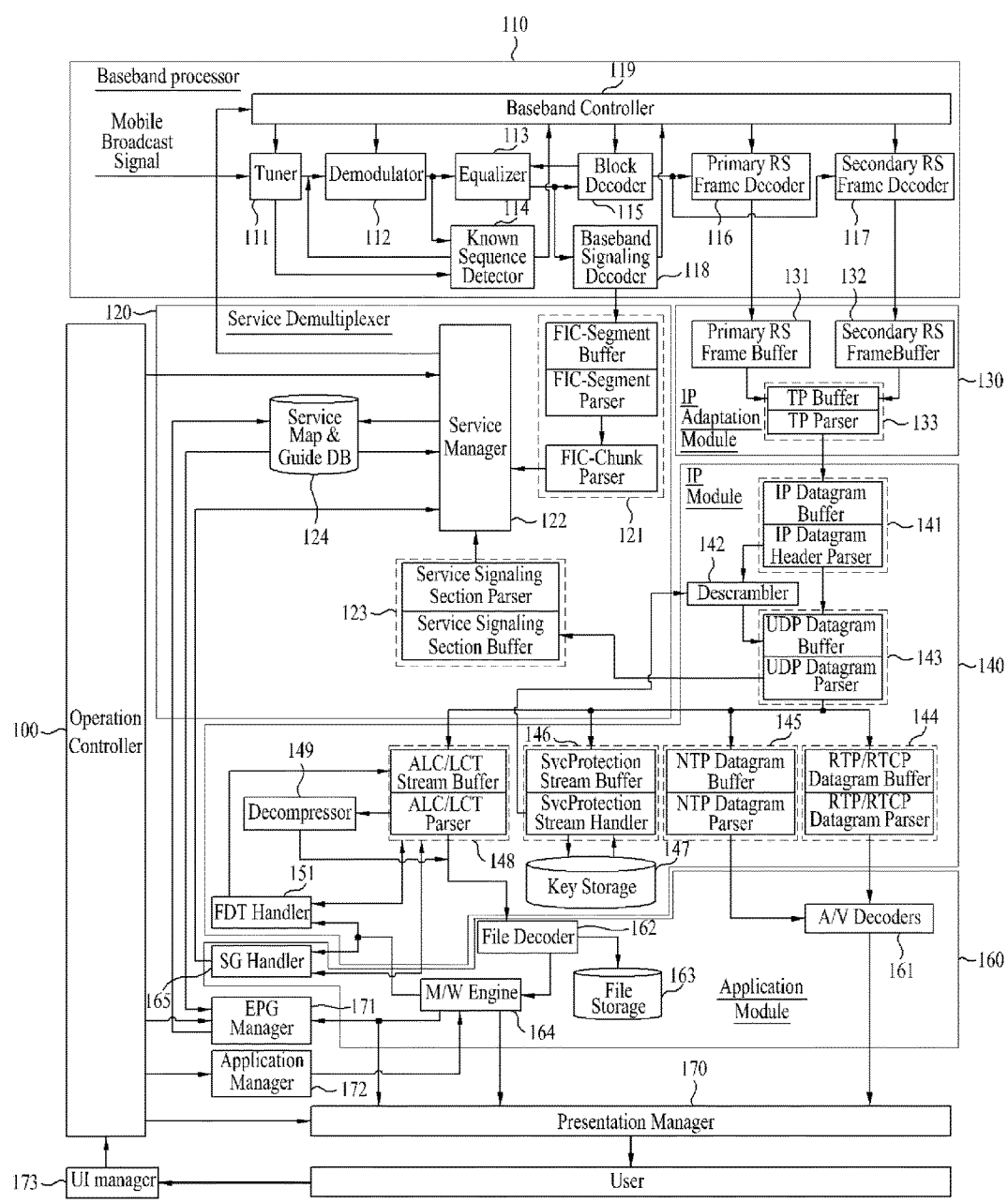
FIG. 2 is an exemplary block diagram showing the configuration of a reception system according to an embodiment of the present invention.

FIG. 2 is an exemplary block diagram of a receiving system according to an embodiment of the present invention.

Referring to FIG. 2, the receiving system according to the present invention may include an operation controller 100, a tuner 111, a demodulator 112, an equalizer 113, a known sequence detector (or known data detector) 114, a block decoder 115, a primary Reed-Solomon (RS) frame decoder 116, a secondary RS frame decoder 117, a signaling decoder 118, and a baseband controller 119. The receiving system according to the present invention may further include an FIC handler 121, a service manager 122, a service signaling handler 123, and a first storage unit 124. The receiving system according to the present invention may further include a primary RS frame buffer 131, a secondary RS frame buffer 132, and a transport packet (TS) handler 133. The receiving system according to the present invention may further include an Internet Protocol (IP) datagram handler 141, a descrambler 142, an User Datagram Protocol (UDP) datagram handler 143, a Real-time Transport Protocol/Real-time Transport Control Protocol (RTP/RTCP) datagram handler 144, a Network Time Protocol (NTP) datagram handler 145, a service protection stream handler 146, a second storage unit 147, an Asynchronous Layered Coding/Layered Coding Transport (ALC/LCT) stream handler 148, a decompressor 149, an Extensible Mark-up Language (XML) parser 150, and a Field Device Tool (FDT) handler 151. The receiving system according to the present invention may further include an Audio/Video (A/V) decoder 161, a file decoder 162, a third storage unit 163, a middle ware (M/W) engine 164, and a Service Guide (SG) handler 165. The receiving system according to the present invention may further include an Electronic Program Guide (EPG) manager 171, an application manager 172, and a User Interface (UI) manager 173.

Herein, for simplicity of the description of the present invention, the operation controller 100, the tuner 111, the demodulator 112, the equalizer 113, the known sequence detector (or known data detector) 114, the block decoder 115, the primary RS frame decoder 116, the secondary RS frame decoder 117, the signaling decoder 118, and the baseband controller 119 will be collectively referred to as a baseband processor 110. The FIC handler 121, the service manager 122, the service signaling handler 123, and the first storage unit 124 will be collectively referred to as a service multiplexer 120. The primary RS frame buffer 131, the secondary RS frame buffer 132, and the TS handler 133 will be collectively referred to as an IP adaptation module 130. The IP datagram handler 141, the descrambler 142, the UDP datagram handler 143, the RTP/RTCP datagram handler 144, the NTP datagram handler 145, the service protection stream handler 146, the second storage unit 147, the ALC/LCT stream handler 148, the XML parser 150, and the FDT handler 151 will be collectively referred to as a common IP module 140. The A/V decoder 161, the file decoder 162, the third storage unit 163, the M/W engine 164, and the SG handler 165 will be collectively referred to as an application module 160.

Figure 19:
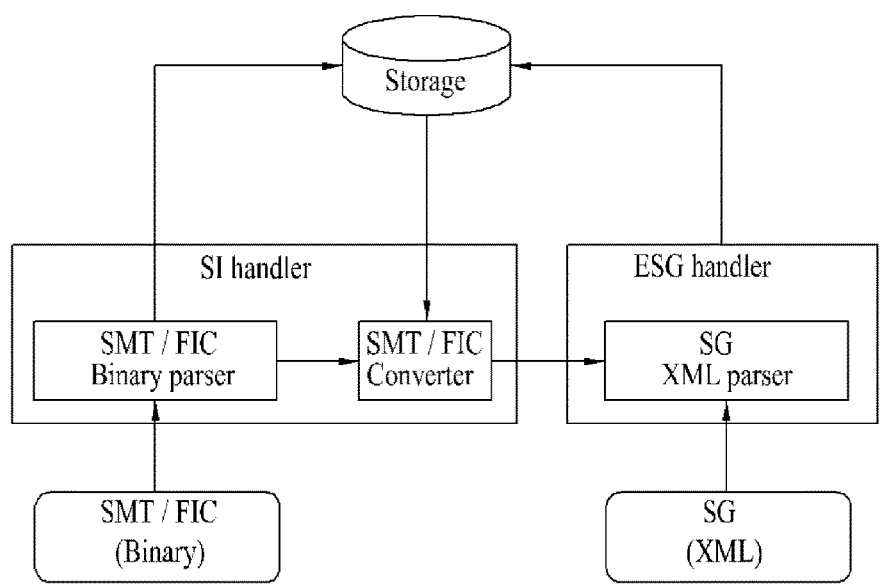
FIG. 19 is a block diagram showing an example of a receiver used for mapping of signaling information configured according to an embodiment of the present invention.

In addition, although the terms used in FIG. 2 are selected from generally known and used terms, some of the terms mentioned in the description of FIG. 19 have been selected by the applicant at his or her discretion, the detailed meanings of which are described in relevant parts of the description herein. Furthermore, it is required that the present invention is understood, not simply by the actual terms used but by the meaning of each term lying within.

Referring to FIG. 2, the operation controller 100 controls the operation of each block included in the baseband processor 110.

By tuning the receiving system to a specific physical channel frequency (or physical transmission channel frequency, PTC), the tuner 111 enables the receiving system to receive main service data, which correspond to broadcast signals for fixed-type broadcast receiving systems, and mobile service data, which correspond to broadcast signals for mobile broadcast receiving systems. At this point, the tuned frequency of the specific physical channel is down-converted to an intermediate frequency (IF) signal, thereby being outputted to the demodulator 112 and the known sequence detector 114. The passband digital IF signal being outputted from the tuner 111 may only include main service data, or only include mobile service data, or include both main service data and mobile service data.

The demodulator 112 performs self-gain control, carrier recovery, and timing recovery processes on the passband digital IF signal inputted from the tuner 111, thereby modifying the IF signal to a baseband signal. Then, the demodulator 112 outputs the baseband signal to the equalizer 113 and the known sequence detector 114. The demodulator 112 uses the known data symbol sequence inputted from the known sequence detector 114 during the timing and/or carrier recovery, thereby enhancing the demodulating performance.

The equalizer 113 compensates channel-associated distortion included in the signal demodulated by the demodulator 112. Then, the equalizer 113 outputs the distortion-compensated signal to the block decoder 115. By using a known data symbol sequence inputted from the known sequence detector 114, the equalizer 113 may enhance the equalizing performance. Furthermore, the equalizer 113 may receive feed-back on the decoding result from the block decoder 115, thereby enhancing the equalizing performance.

The known sequence detector 114 detects known data place (or position) inserted by the transmitting system from the input/output data (i.e., data prior to being demodulated or data being processed with partial demodulation). Then, the known sequence detector 114 outputs the detected known data position information and known data sequence generated from the detected position information to the demodulator 112, the equalizer 113, and the baseband controller 119. Additionally, in order to allow the block decoder 115 to identify the mobile service data that have been processed with additional encoding by the transmitting system and the main service data that have not been processed with any additional encoding, the known sequence detector 114 outputs such corresponding information to the block decoder 115.

If the data channel-equalized by the equalizer 113 and inputted to the block decoder 115 correspond to data processed with both block-encoding of serial concatenated convolution code (SCCC) method and trellis-encoding by the transmitting system (i.e., data within the RS frame, signaling data), the block decoder 115 may perform trellis-decoding and block-decoding as inverse processes of the transmitting system. On the other hand, if the data channel-equalized by the equalizer 113 and inputted to the block decoder 115 correspond to data processed only with trellis-encoding and not block-encoding by the transmitting system (i.e., main service data), the block decoder 115 may perform only trellis-decoding.

The signaling decoder 118 decodes signaling data that have been channel-equalized and inputted from the equalizer 113. It is assumed that the signaling data (or signaling information) inputted to the signaling decoder 118 correspond to data processed with both block-encoding and trellis-encoding by the transmitting system. Examples of such signaling data may include transmission parameter channel (TPC) data and fast information channel (FIC) data. For example, among the data that are being inputted, the signaling decoder 118 performs regressive turbo decoding of a parallel concatenated convolution code (PCCC) method on data corresponding to the signaling information region. Subsequently, the signaling decoder 118 separates FIC data and TPC data from the regressive-turbo-decoded signaling data. Additionally, the signaling decoder 118 performs RS-decoding as inverse processes of the transmitting system on the separated TPC data, thereby outputting the processed data to the baseband controller 119. Also, the signaling decoder 118 performs deinterleaving in sub-frame units on the separated FIC data, so as to perform RS-decoding as inverse processes of the transmitting system on the deinterleaved FIC data, thereby outputting the processed data to the FIC handler 121. The FIC data being deinterleaved and RS-decoded from the signaling decoder 118 and outputted to the FIC handler 121 are transmitted in units of FIC segments.

The FIC handler 121 receives FIC data from the signaling decoder 118, so as to extract signaling information for service acquisition (i.e., mapping information an ensemble to a mobile service). In order to do so, the FIC handler 121 may include an FIC segment buffer, an FIC segment parser, and an FIC chunk parser.

The FIC segment buffer buffers FIC segment groups being inputted in M/H frame units from the signaling decoder 118, thereby outputting the buffered FIC segment groups to the FIC segment parser. Thereafter, the FIC segment parser extracts the header of each FIC segment stored in the FIC segment buffer so as to analyze the extracted headers. Then, based upon the analyzed result, the FIC segment parser outputs the payload of the respective FIC segments to the FIC chunk parser. The FIC chunk parser uses the analyzed result outputted from the FIC segment parser so as to recover the FIC chunk data structure from the FIC segment payloads, thereby analyzing the received FIC chunk data structure. Subsequently, the FIC chunk parser extracts the signaling information for service acquisition. The signaling information acquired from the FIC chunk parser is outputted to the service manager 122.

Meanwhile, the service signaling handler 123 consists of a service signaling buffer and a service signaling parser. Herein, the service signaling handler 123 buffers table sections of a service signaling channel being transmitted from the UDP datagram handler 143, thereby analyzing and processing the buffered table sections. Similarly, the signaling information processed by the service signaling handler 123 is also outputted to the service manager 122.

The service signaling channel transferring a service map table (SMT) section is received via the RS frame according to one embodiment of the present invention. The RS frame is a type of UDP/IP packet having a well-known IP destination address and well-known destination UDP port number. Accordingly, a receiver can process the SMT section and therein the descriptor without separate information.

In this case, the SMT section provides signaling information related to all services in the Ensemble including the corresponding SMT section. Accordingly, the receiver can access an IP stream component in wanted service using the SMT section data and provide corresponding service to user.

The SMT section data is stored the first storage unit 124 collected by the service manager 122. In this case, the stored SMT section data is changed a service map format by the service manager 122.

The service manager 122 uses the signaling information collected from each of the FIC handler 121 and the service signaling handler 123, so as to configure a service map. Thereafter, the service manager 122 uses a service guide (SG) collected from the service guide (SG) handler 165 so as to draw up a program guide. Then, the service manager 122 controls the baseband controller 119 so that a user can receive (or be provided with) a user-requested mobile service by referring to the service map and service guide. Furthermore, the service manager 122 may also control the receiving system so that the program guide can be displayed on at least a portion of the display screen based upon the user's input.

The first storage unit 124 stores the service map and service guide drawn up by the service manager 122. Also, based upon the requests from the service manager 122 and the EPG manager 171, the first storage unit 124 extracts the required data, which are then transferred to the service manager 122 and/or the EPG manager 171.

The operation controller 100 stores a service map and a service guide provided by the service manager 122. Moreover, the operation controller 100 extracts required data according to a request of the service manager 122 or the EPG manager 171 and transfers the extracted data to the service manager 122 or the EPG manager 171.

The operation controller 100 receives the known data place information and TPC data, thereby transferring M/H frame time information, information indicating whether or not a data group exists in a selected parade, place information of known data within a corresponding data group, power control information, and so on to each block within the baseband processor 110. The TPC data will be described in detail in a later process.

Meanwhile, according to the present invention, the transmitting system uses RS frames by encoding units. Herein, the RS frame may be divided into a primary RS frame and a secondary RS frame. However, according to the embodiment of the present invention, the primary RS frame and the secondary RS frame will be divided based upon the level of importance of the corresponding data.

The primary RS frame decoder 116 receives the data outputted from the block decoder 115. At this point, according to the embodiment of the present invention, the primary RS frame decoder 116 receives only the mobile service data that have been Reed-Solomon (RS)-encoded and/or cyclic redundancy check (CRC)-encoded from the block decoder 115.

Herein, the primary RS frame decoder 116 receives at least one of the mobile service data, the NRT service data, the SMT section data, OMA BCAST SG data, and not the main service data. The primary RS frame decoder 116 performs inverse processes of an RS frame encoder (not shown) included in the digital broadcast transmitting system, thereby correcting errors existing within the primary RS frame. More specifically, the primary RS frame decoder 116 forms a primary RS frame by grouping a plurality of data groups and, then, correct errors in primary RS frame units. In other words, the primary RS frame decoder 116 decodes primary RS frames, which are being transmitted for actual broadcast services. The primary RS frame decoded by the primary RS frame decoder 116 outputs to the primary RS frame buffer 131. The primary RS frame buffer 131 buffers the primary RS frame, and then configures an M/H TP in each row unit. The M/H TPs of the primary RS frame outputs to the TP handler 133.

Additionally, the secondary RS frame decoder 117 receives the data outputted from the block decoder 115. At this point, according to the embodiment of the present invention, the secondary RS frame decoder 117 receives only the mobile service data that have been RS-encoded and/or CRC-encoded from the block decoder 115. Herein, the secondary RS frame decoder 117 receives only the mobile service data and not the main service data. The secondary RS frame decoder 117 performs inverse processes of an RS frame encoder (not shown) included in the digital broadcast transmitting system, thereby correcting errors existing within the secondary RS frame. More specifically, the secondary RS frame decoder 117 forms a secondary RS frame by grouping a plurality of data groups and, then, correct errors in secondary RS frame units. In other words, the secondary RS frame decoder 117 decodes secondary RS frames, which are being transmitted for mobile audio service data, mobile video service data, guide data, and so on. The secondary RS frame decoded by the secondary RS frame decoder 117 outputs to the secondary RS frame buffer 132. The secondary RS frame buffer 132 buffers the secondary RS frame, and then configures an M/H TP in each row unit. The M/H TPs of the secondary RS frame outputs to the TP handler 133.

The TP handler 133 consists of a TP buffer and a TP parser. The TP handler 133 buffers the M/H TPs inputted from the primary RS frame buffer 131 and the secondary RS frame buffer 132, and then extracts and analyzes each header of the buffered M/H TPs, thereby recovering IP datagram from each payload of the corresponding M/H TPs. The recovered IP datagram is outputted to the IP datagram handler 141.

The IP datagram handler 141 consists of an IP datagram buffer and an IP datagram parser. The IP datagram handler 141 buffers the IP datagram delivered from the TP handler 133, and then extracts and analyzes a header of the buffered IP datagram, thereby recovering UDP datagram from a payload of the corresponding IP datagram. The recovered UDP datagram is outputted to the UDP datagram handler 143.

If the UDP datagram is scrambled, the scrambled UDP datagram is descrambled by the descrambler 142, and the descrambled UDP datagram is outputted to the UDP datagram handler 143. For example, when the UDP datagram among the received IP datagram is scrambled, the descrambler 142 descrambles the UDP datagram by inputting an encryption key and so on from the service protection stream handler 146, and outputs the descrambled UDP datagram to the UDP datagram handler 143.

The UDP datagram handler 143 consists of an UDP datagram buffer and an UDP datagram parser. The UDP datagram handler 143 buffers the UDP datagram delivered from the IP datagram handler 141 or the descrambler 142, and then extracts and analyzes a header of the buffered UDP datagram, thereby recovering data transmitted through a payload of the corresponding UDP datagram. If the recovered data is an RTP/RTCP datagram, the recovered data is outputted to the RTP/RTCP datagram handler 144. If the recovered data is also an NTP datagram, the recovered data is outputted to the NTP datagram handler 145. Furthermore, if the recovered data is a service protection stream, the recovered data is outputted to the service protection stream handler 146. And, if the recovered data is an ALC/LCT stream, the recovered data is outputted to the ALC/LCT steam handler 148.

The IP datagram handler 141 and UDP datagram handler 143 can output data including the SMT section data to the service signaling section handler 123.

The RTP/RTCP datagram handler 144 consists of an RTP/RTCP datagram buffer and an RTP/RTCP datagram parser. The RTP/RTCP datagram handler 144 buffers the data of RTP/RTCP structure outputted from the UDP datagram handler 143, and then extracts A/V stream from the buffered data, thereby outputting the extracted A/V stream to the A/V decoder 161.

The A/V decoder 161 decodes the audio and video streams outputted from the RTP/RTCP datagram handler 144 using audio and video decoding algorithms, respectively. The decoded audio and video data is outputted to the presentation manager 170. Herein, at least one of an AC-3 decoding algorithm, an MPEG 2 audio decoding algorithm, an MPEG 4 audio decoding algorithm, an AAC decoding algorithm, an AAC+ decoding algorithm, an HE AAC decoding algorithm, an AAC SBR decoding algorithm, an MPEG surround decoding algorithm, and a BSAC decoding algorithm can be used as the audio decoding algorithm and at least one of an MPEG 2 video decoding algorithm, an MPEG 4 video decoding algorithm, an H.264 decoding algorithm, an SVC decoding algorithm, and a VC-1 decoding algorithm can be used as the audio decoding algorithm.

The NTP datagram handler 145 consists of an NTP datagram buffer and an NTP datagram parser. The NTP datagram handler 145 buffers data having an NTP structure, the data being outputted from the UDP datagram handler 143. Then, the NTP datagram handler 145 extracts an NTP stream from the buffered data. Thereafter, the extracted NTP stream is outputted to the A/V decoder 161 so as to be decoded.

The service protection stream handler 146 may further include a service protection stream buffer. Herein, the service protection stream handler 146 buffers data designated (or required) for service protection, the data being outputted from the UDP datagram handler 143. Subsequently, the service protection stream handler 146 extracts required information for descrambling from the extracted data. The information required for descrambling includes a key value, such as STKM and LTKM. The information for descrambling is stored in the second storage unit 147, and, when required, the information for descrambling is outputted to the descrambler 142.

The ALC/LCT stream handler 148 consists of an ALC/LCT stream buffer and an ALC/LCT stream parser. And, the ALC/LCT stream handler 148 buffers data having an ALC/LCT structure, the data being outputted from the UDP datagram handler 143. Then, the ALC/LCT stream handler 148 analyzes a header and a header expansion of an ALC/LCT session from the buffered data. Based upon the analysis result of the header and header expansion of the ALC/LCT session, when the data being transmitted to the ALC/LCT session correspond to an XML structure, the corresponding data are outputted to an XML parser 150. Alternatively, when the data being transmitted to the ALC/LCT session correspond to a file structure, the corresponding data are outputted to a file decoder 162. At this point, when the data that are being transmitted to the ALC/LCT session are compressed, the compressed data are decompressed by a decompressor 149, thereby being outputted to the XML parser 150 or the file decoder 162.

If the data transferred through the ALC/LCT session is compressed, the decompressor 149 decompresses the transferred data and outputs the decompressed data to the file decoder 162.

The FDT handler 151 analyzes and processes a file description table of a FLUTE protocol, which is transmitted in an XML structure through the ALC/LCT session.

The SG handler 165 collects and analyzes the data designated for a service guide, the data being transmitted in an XML structure, thereby outputting the analyzed data to the service manager 122.

The file decoder 162 decodes the data having a file structure and being transmitted through the ALC/LCT session, thereby outputting the decoded data to the middleware engine 164 or storing the decoded data in a third storage unit 163. Herein, the middleware engine 164 translates the file structure data (i.e., the application) and executes the translated application. Thereafter, the application may be outputted to an output device, such as a display screen or speakers, through the application presentation manager 170. According to an embodiment of the present invention, the middleware engine 164 corresponds to a JAVA-based middleware engine.

Based upon a user-input, the EPG manager 171 receives EPG data either through the service manager 122 or through the SG handler 165, so as to convert the received EPG data to a display format, thereby outputting the converted data to the presentation manager 170.

The application manager 172 performs overall management associated with the processing of application data, which are being transmitted in object formats, file formats, and so on. Furthermore, based upon a user-command inputted through the UI manager 173, the operation controller 100 controls at least one of the service manager 122, the EPG manager 171, the application manager 172, and the presentation manager 170, so as to enable the user-requested function to be executed. The UI manager 173 transfers the user-input to the operation controller 100 through the UI.

Finally, the presentation manager 170 provides at least one of the audio and video data being outputted from the A/V decoder 161 and the EPG data being outputted from the EPG manager 171 to the user through the speaker and/or display screen.

Regarding the present invention, the NRT service is included the mobile broadcast service. The NRT service is signaled by the SMT section. In this case, the SMT section, for example, is extracted from the primary RS frame decoder 116 or the second RS frame decoder 117. The extracted SMT section data is processed by IP module through the IP adaptation module. At this time, the IP datagram including the extracted SMT section is processed by IP datagram handler 141. And the UDP datagram is processed by the UDP datagram handler 143. The UDP datagram handler 143 extracts the SMT section data from the processed UDP datagram. The extracted SMT section data is processed by service signaling section handler 123. Moreover, the FDT data and the NRT service data except the SMT section data may provide an NRT service processed by the mobile broadcast receiver through ALC/LCT processor.

A Description for Relations Among NRT Service, Content Item and File

Figure 3:
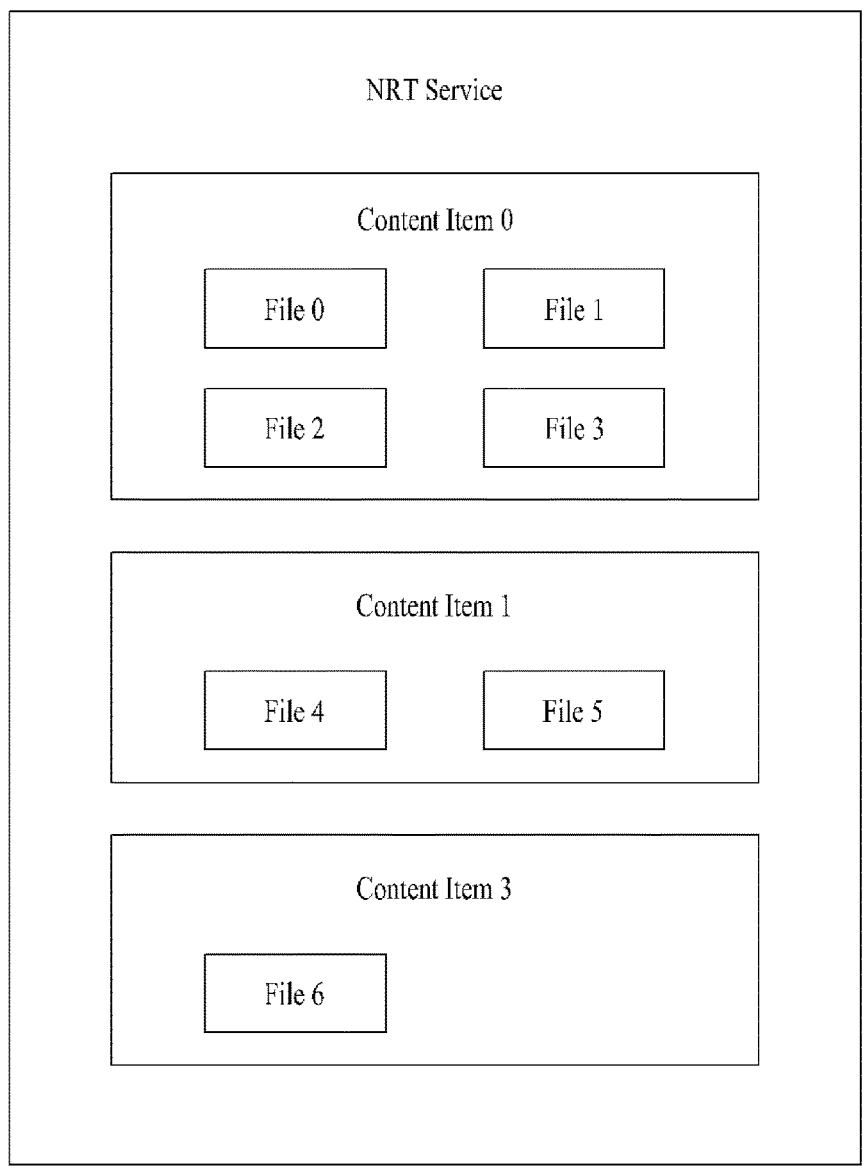
FIG. 3 is an exemplary diagram explaining relations between an NRT service, content items and files.

FIG. 3 is an exemplary diagram explaining relations between an NRT service, content items and files.

Referring to FIG. 3, an NRT service can include one or more content items. And, each of the content items can include one or more files. And, each of the content items is an independently playable entity and may correspond to a program or an event in a real time broadcast. Therefore, the NRT service means a group that is serviceable with a combination of the above content items. And, the NRT service corresponds to a channel concept in real time.

In a mobile service environment, since signaling information of received mobile NRT service data is insufficient, it is difficult for a receiver to properly process a mobile NRT service, even when the mobile NRT service is received.

In order for a receiver to properly process the above NRT service, signaling for the corresponding NRT service is required. The present invention intends to properly process an NRT service received by a receiver by defining and providing the signaling information. Besides, details of the signaling information shall be described in the description of the corresponding part.

Hereinafter, in the present specification, the use of a Service Map Table (SMT) and an Open Mobile Alliance (OMA) Mobile Broadcast Services Enabler Suite (BCAST) Service Guide (SG) for signaling of a mobile NRT service will be described.

First, the receiver may, for example, identify whether a mobile service is a mobile NRT service by referring to a service_category field in the SMT. One or more content items in the mobile NRT service may be identified using a content_id field in a File Description Table (FDT) and a content identifier in the OMA BCAST SG. In addition, the mobile NRT service may be, for example, identified using a service identifier in the OMA BCAST SG and NRT_service_id in the SMT.

The signaling information is defined in different formats. Accordingly, in the present specification, a method of mapping identifiers in different formats is also provided in order to enable the receiver to process the signaling information. Accordingly, the receiver can properly process the received NRT service.

The mobile NRT service is transmitted in a FLUTE session, and FDT information is extracted from the FLUTE session. The content_id in the extracted FDT information may be mapped to the content identifier of the OMA BCAST SG, and NRT service content selected by a user or the like may be checked and received. The mapping method is given below. For example, files configuring a content item are identified using a Transport Object Identifier (TOI) and Content-Location field defined in the FDT within the FLUTE session, and the connection of the TOI or the Content-Location and the content item may be accomplished by mapping the content_ID field of the FDT to the content identifier field of the OMA BCAST SG. Only the concept of the present invention is described herein and the detailed description thereof will be described later in detail.

A Protocol for a Mobil NRT Service

First of all, NRT services can be mainly categorized into a fixed NRT service and a mobile NRT service according to a type of acquiring an IP datagram. In the following description, the mobile NRT service is specified for clarity and convenience of explanation.

FIG. 4 is a diagram for a protocol stack of a mobile NRT service configured according to an embodiment of the present invention.

In FIG. 4, an IP datagram containing signaling information may be transmitted without using an MPEG-2 TS format, by inserting an adaption layer between an IP layer and a physical layer.

In FIG. 18, an NRT service for a mobile service is packetized according to a User Datagram Protocol (UDP) scheme in the IP layer, and a UDP packet is packetized again according to an IP scheme, thereby obtaining UDP/IP packet data. In the present specification, the packetized UDP/IP packet data is referred to as an IP datagram for simplicity. In addition, a signaling information channel containing an SMT is also packetized according to a UDP scheme and a UDP packet is packetized again according to an IP scheme, thereby obtaining UDP/IP packet data.

In FIG. 4, an OMA BCAST SG and NRT content items/files are packetized according to a FLUTE scheme and are packetized again according to an Asynchronous Layered Coding/Layered Coding Transport (ALC/LCT) scheme. An ALC/LCT packet is packetized again according to an IP scheme, thereby obtaining ALC/LCT/UDP/IP packet data.

Moreover, an RS frame including the packetized IP datagram is generated. The generated RS frame is transmitted to a receiving system modulated by pre-defined transmission method (e.g. VSB).

A Structure of Data Format for the Mobile NRT Service

Meanwhile, the data structure used in the mobile broadcasting technology according to the embodiment of the present invention may include a data group structure and an RS frame structure, which will now be described in detail.

Figure 5:
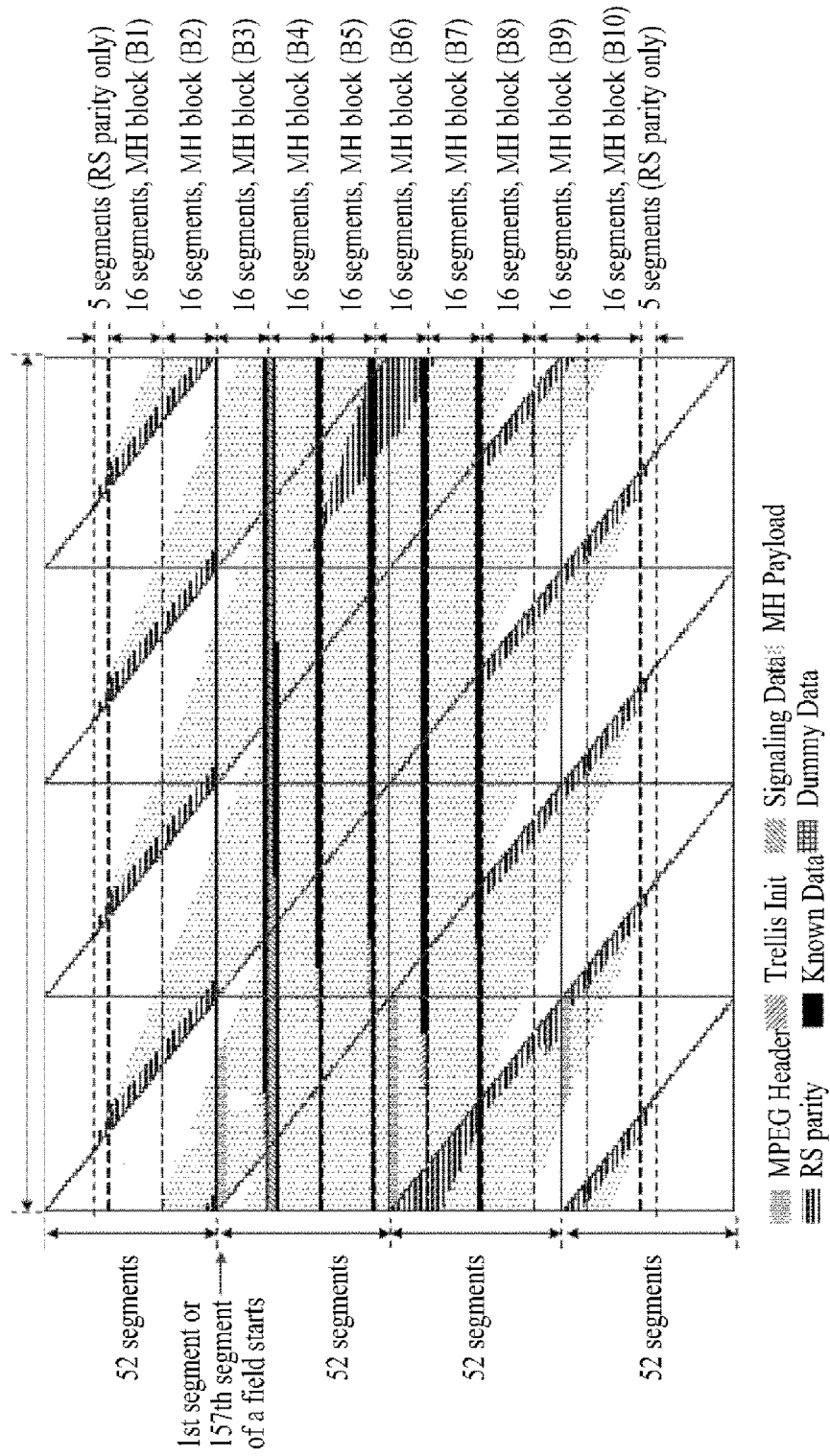
FIG. 5 is a view showing an embodiment of the structure of a data group according to the present invention.

FIG. 5 illustrates an exemplary structure of a data group according to the present invention. FIG. 5 shows an example of dividing a data group according to the data structure of the present invention into 10 M/H blocks (i.e., M/H block 1 (B1) to M/H block 10 (B10)). In this example, each M/H block has the length of 16 segments. Referring to FIG. 5, only the RS parity data are allocated to portions of the 5 segments before the M/H block 1 (B1) and the 5 segments following the M/H block 10 (B10). The RS parity data are excluded in regions A to D of the data group. More specifically, when it is assumed that one data group is divided into regions A, B, C, and D, each M/H block may be included in any one of region A to region D depending upon the characteristics of each M/H block within the data group.

Herein, the data group is divided into a plurality of regions to be used for different purposes. More specifically, a region of the main service data having no interference or a very low interference level may be considered to have a more resistant (or stronger) receiving performance as compared to regions having higher interference levels. Additionally, when using a system inserting and transmitting known data in the data group, wherein the known data are known based upon an agreement between the transmitting system and the receiving system, and when consecutively long known data are to be periodically inserted in the mobile service data, the known data having a predetermined length may be periodically inserted in the region having no interference from the main service data (i.e., a region wherein the main service data are not mixed). However, due to interference from the main service data, it is difficult to periodically insert known data and also to insert consecutively long known data to a region having interference from the main service data.

Referring to FIG. 5, M/H block 4 (B4) to M/H block 7 (B7) correspond to regions without interference of the main service data. M/H block 4 (B4) to M/H block 7 (B7) within the data group shown in FIG. 2 correspond to a region where no interference from the main service data occurs. In this example, a long known data sequence is inserted at both the beginning and end of each M/H block. In the description of the present invention, the region including M/H block 4 (B4) to M/H block 7 (B7) will be referred to as "region A (=B4+B5+B6+B7)". As described above, when the data group includes region A having a long known data sequence inserted at both the beginning and end of each M/H block, the receiving system is capable of performing equalization by using the channel information that can be obtained from the known data. Therefore, the strongest equalizing performance may be yielded (or obtained) from one of region A to region D.

In the example of the data group shown in FIG. 2, M/H block 3 (B3) and M/H block 8 (B8) correspond to a region having little interference from the main service data. Herein, a long known data sequence is inserted in only one side of each M/H block B3 and B8. More specifically, due to the interference from the main service data, a long known data sequence is inserted at the end of M/H block 3 (B3), and another long known data sequence is inserted at the beginning of M/H block 8 (B8). In the present invention, the region including M/H block 3 (B3) and M/H block 8 (B8) will be referred to as "region B (=B3+B8)". As described above, when the data group includes region B having a long known data sequence inserted at only one side (beginning or end) of each M/H block, the receiving system is capable of performing equalization by using the channel information that can be obtained from the known data. Therefore, a stronger equalizing performance as compared to region C/D may be yielded (or obtained).

Referring to FIG. 5, M/H block 2 (B2) and M/H block 9 (B9) correspond to a region having more interference from the main service data as compared to region B. A long known data sequence cannot be inserted in any side of M/H block 2 (B2) and M/H block 9 (B9). Herein, the region including M/H block 2 (B2) and M/H block 9 (B9) will be referred to as "region C (=B2+B9)". Finally, in the example shown in FIG. 2, M/H block 1 (B1) and M/H block 10 (B10) correspond to a region having more interference from the main service data as compared to region C. Similarly, a long known data sequence cannot be inserted in any side of M/H block 1 (B1) and M/H block 10 (B10). Herein, the region including M/H block 1 (B1) and M/H block 10 (B10) will be referred to as "region D (=B1+B10)". Since region C/D is spaced further apart from the known data sequence, when the channel environment undergoes frequent and abrupt changes, the receiving performance of region C/D may be deteriorated.

Additionally, the data group includes a signaling information area wherein signaling information is assigned (or allocated). In the present invention, the signaling information area may start from the 1st segment of the 4th M/H block (B4) to a portion of the 2nd segment. According to an embodiment of the present invention, the signaling information area for inserting signaling information may start from the 1st segment of the 4th M/H block (B4) to a portion of the 2nd segment. More specifically, 276(=207+69) bytes of the 4th M/H block (B4) in each data group are assigned as the signaling information area. In other words, the signaling information area consists of 207 bytes of the 1st segment and the first 69 bytes of the 2nd segment of the 4th M/H block (B4). The 1st segment of the 4th M/H block (B4) corresponds to the 17th or 173rd segment of a VSB field.

Herein, the signaling data transmitted through the signaling information area may be identified by two different types of signaling channel data: a transmission parameter channel (TPC) data and a fast information channel (FIC) data.

Also, the TPC data includes parameters that are mostly used in a physical layer module. And, since the TPC data are transmitted without being interleaved, the TPC data may be accessed by slot unit in the receiving system. The FIC data are provided in order to enable the receiving system to perform fast service acquisition. Herein, the FIC data include cross layer information between a physical layer and an upper layer. The FIC data are interleaved in sub-frame units and then transmitted.

For example, when the data group includes 6 known data sequences, as shown in FIG. 2, the signaling information area is located between the first known data sequence and the second known data sequence. More specifically, the first known data sequence is inserted in the last 2 segments of the 3rd M/H block (B3), and the second known data sequence in inserted in the 2nd and 3rd segments of the 4th M/H block (B4). Furthermore, the 3rd to 6th known data sequences are respectively inserted in the last 2 segments of each of the 4th, 5th, 6th, and 7th M/H blocks (B4, B5, B6, and B7). The 1st and 3rd to 6th known data sequences are spaced apart by 16 segments.

A RS Frame Including the Mobile NRT Service

Figure 6:
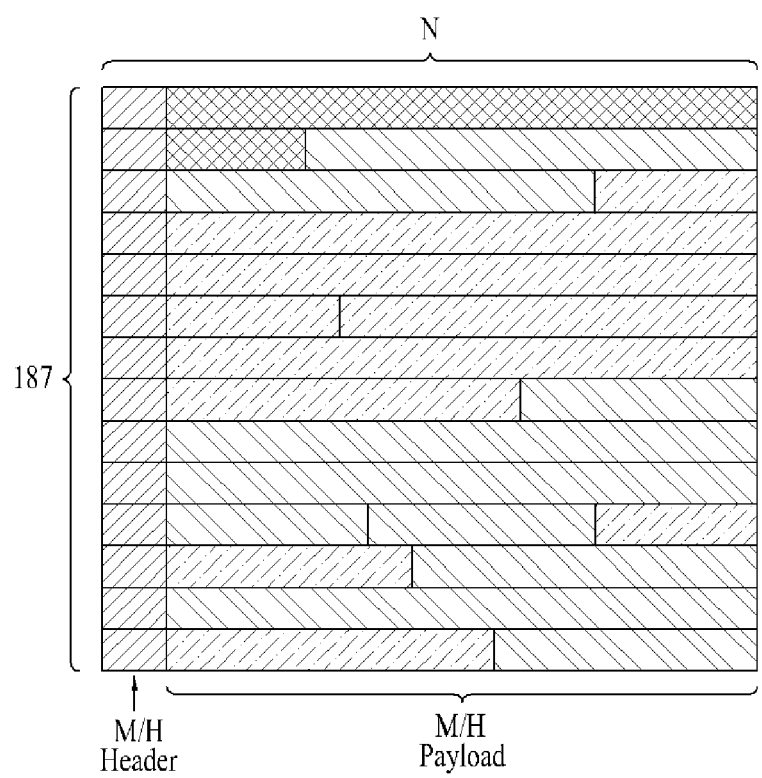
FIG. 6 is a view showing the structure of an RS frame containing a mobile NRT service configured according to an embodiment of the present invention.

FIG. 6 is a view showing the structure of an RS frame containing a mobile NRT service configured according to an embodiment of the present invention.

The RS frame is received for each M/H frame in a condition where the receiving system is switched to a time-slicing mode. Each RS frame includes IP streams of each mobile service data or signaling data, and service map table (SMT) section data may exist in all RS frames. The SMT section data may be an IP stream type, or a different data type. The RS frame data is allocated to region corresponding to a plurality of data groups, and transmitted to a receiving system.

The RS frame according to the embodiment of the present invention consists of at least one M/H transport packet (TP). Herein, the M/H TP includes an M/H header and an M/H payload.

The M/H payload may include mobile service data as well as signaling data. More specifically, an M/H payload may include only mobile service data, or may include only signaling data, or may include both mobile service data and signaling data. In this case, the mobile service data can include an NRT service according to the present invention.

Also, when the M/H TP includes a second M/H header, this indicates that the M/H payload includes both the signaling data and the mobile service data. Finally, when M/H TP includes a third M/H header, this indicates that the M/H payload includes only the mobile service data. In the example shown in FIG. 6, the RS frame is assigned with an IP datagram (IP datagram 1) for a SMT and IP datagrams (IP datagram 2 and IP datagram 3) for two service types.

A Structure of Transmission Data

Figure 7:
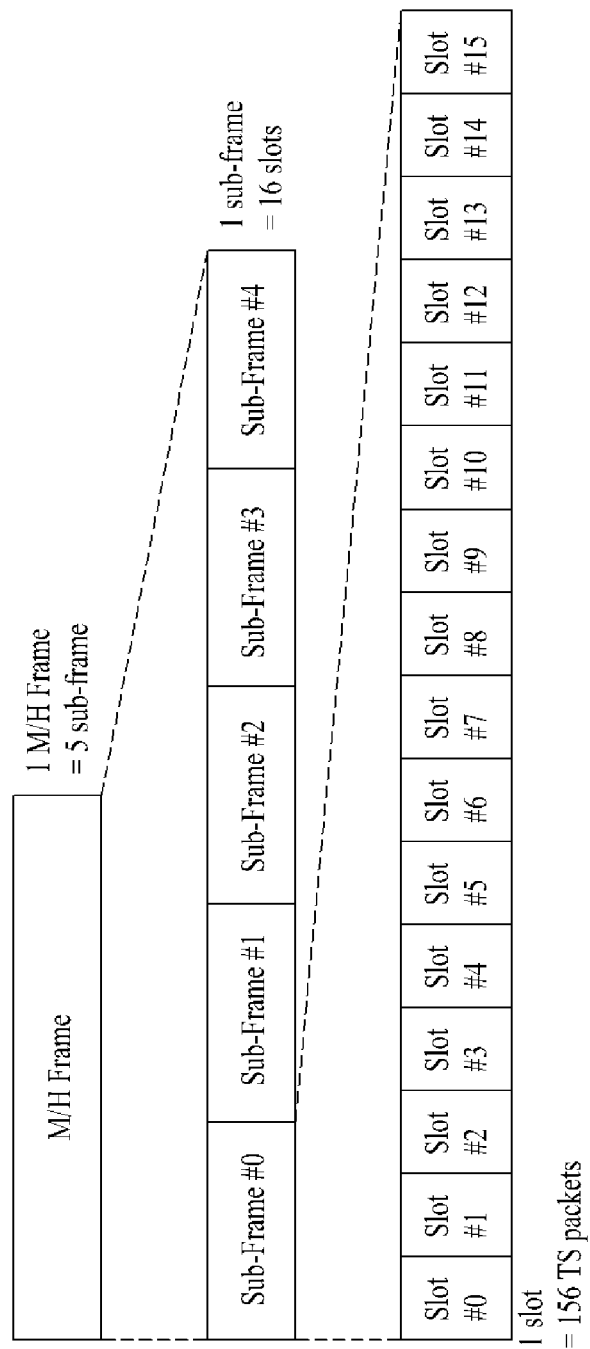
FIG. 7 is a view showing an example of an M/H frame structure for transmission or reception of mobile service data according to the present invention.

FIG. 7 is a view showing an example of a structure of an M/H frame for transmitting and receiving mobile service data according to the present invention.

In the example shown in FIG. 4, one M/H frame consists of 5 sub-frames, wherein each sub-frame includes 16 slots. In this case, the M/H frame according to the present invention includes 5 sub-frames and 80 slots. Also, in a packet level, one slot is configured of 156 data packets (i.e., transport stream packets), and in a symbol level, one slot is configured of 156 data segments. Herein, the size of one slot corresponds to one half (½) of a VSB field. More specifically, since one 207-byte data packet has the same amount of data as a data segment, a data packet prior to being interleaved may also be used as a data segment. At this point, two VSB fields are grouped to form a VSB frame.

Figure 8:
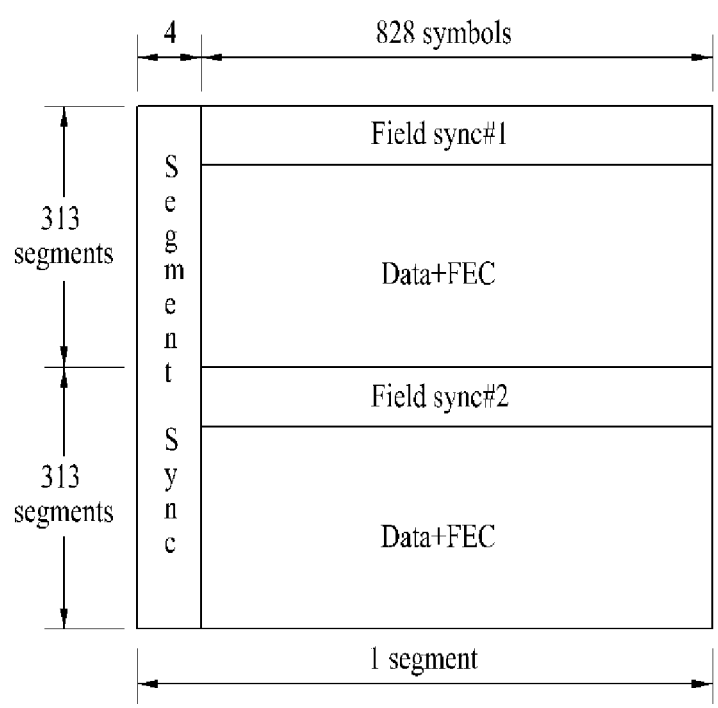
FIG. 8 is a view showing an example of the structure of a VSB frame.

FIG. 8 illustrates an exemplary structure of a VSB frame, wherein one VSB frame consists of 2 VSB fields (i.e., an odd field and an even field). Herein, each VSB field includes a field synchronization segment and 312 data segments. The slot corresponds to a basic time unit for multiplexing the mobile service data and the main service data.

Herein, one slot may either include the mobile service data or be configured only of the main service data. If the first 118 data packets within the slot correspond to a data group, the remaining 38 data packets become the main service data packets. In another example, when no data group exists in a slot, the corresponding slot is configured of 156 main service data packets.

Meanwhile, the mobile service data within one RS frame may be assigned either to all of regions A/B/C/D within the corresponding data group, or to at least one of regions A/B/C/D. In the embodiment of the present invention, the mobile service data within one RS frame may be assigned either to all of regions A/B/C/D, or to at least one of regions A/B and regions C/D. If the mobile service data are assigned to the latter case (i.e., one of regions A/B and regions C/D), the RS frame being assigned to regions A/B and the RS frame being assigned to regions C/D within the corresponding data group are different from one another.

According to the embodiment of the present invention, the RS frame being assigned to regions A/B within the corresponding data group will be referred to as a "primary RS frame", and the RS frame being assigned to regions C/D within the corresponding data group will be referred to as a "secondary RS frame", for simplicity. Also, the primary RS frame and the secondary RS frame form (or configure) one parade. More specifically, when the mobile service data within one RS frame are assigned either to all of regions A/B/C/D within the corresponding data group, one parade transmits one RS frame. Conversely, when the mobile service data within one RS frame are assigned either to at least one of regions A/B and regions C/D, one parade may transmit up to 2 RS frames. More specifically, the RS frame mode indicates whether a parade transmits one RS frame, or whether the parade transmits two RS frames. Such RS frame mode is transmitted as the TPC data. Table 1 below shows an example of the RS frame mode. The following Table 4 is an exemplary diagram for the RS frame mode.

TABLE 1

| Value | Application Identifier Format |
|---|---|
| 0x0000 | DASE application |
| 0x0001 | ATSC reserved |
| 0x0002 | ATSC A/92 Application |
| 0x0003 | NRT Application |
| 0x0004-0x7FFF | ATSC reserved |
| 0x8000-0xFFFF | User private |

Table 1 illustrates an example of allocating 2 bits in order to indicate the RS frame mode. For example, referring to Table 1, when the RS frame mode value is equal to '00', this indicates that one parade transmits one RS frame. And, when the RS frame mode value is equal to '01', this indicates that one parade transmits two RS frames, i.e., the primary RS frame and the secondary RS frame. More specifically, when the RS frame mode value is equal to '01', data of the primary RS frame for regions A/B are assigned and transmitted to regions A/B of the corresponding data group. Similarly, data of the secondary RS frame for regions C/D are assigned and transmitted to regions C/D of the corresponding data group.

As described in the assignment of data groups, the parades are also assigned to be spaced as far apart from one another as possible within the sub-frame. Thus, the receiving system can be capable of responding promptly and effectively to any burst error that may occur within a sub-frame. Furthermore, the method of assigning parades may be identically applied to all M/H frames or differently applied to each M/H frame. According to the embodiment of the present invention, the parades may be assigned differently for each M/H frame and identically for all sub-frames within an M/H frame. More specifically, the M/H frame structure may vary by M/H frame units. Thus, an ensemble rate may be adjusted on a more frequent and flexible basis.

That is, the concept of an M/H ensemble is applied in the embodiment of the present invention, thereby defining a collection (or group) of services. Each M/H ensemble carries the same QoS and is coded with the same FEC code. Also, each M/H ensemble has the same unique identifier (i.e., ensemble ID) and corresponds to consecutive RS frames.

Figure 9:
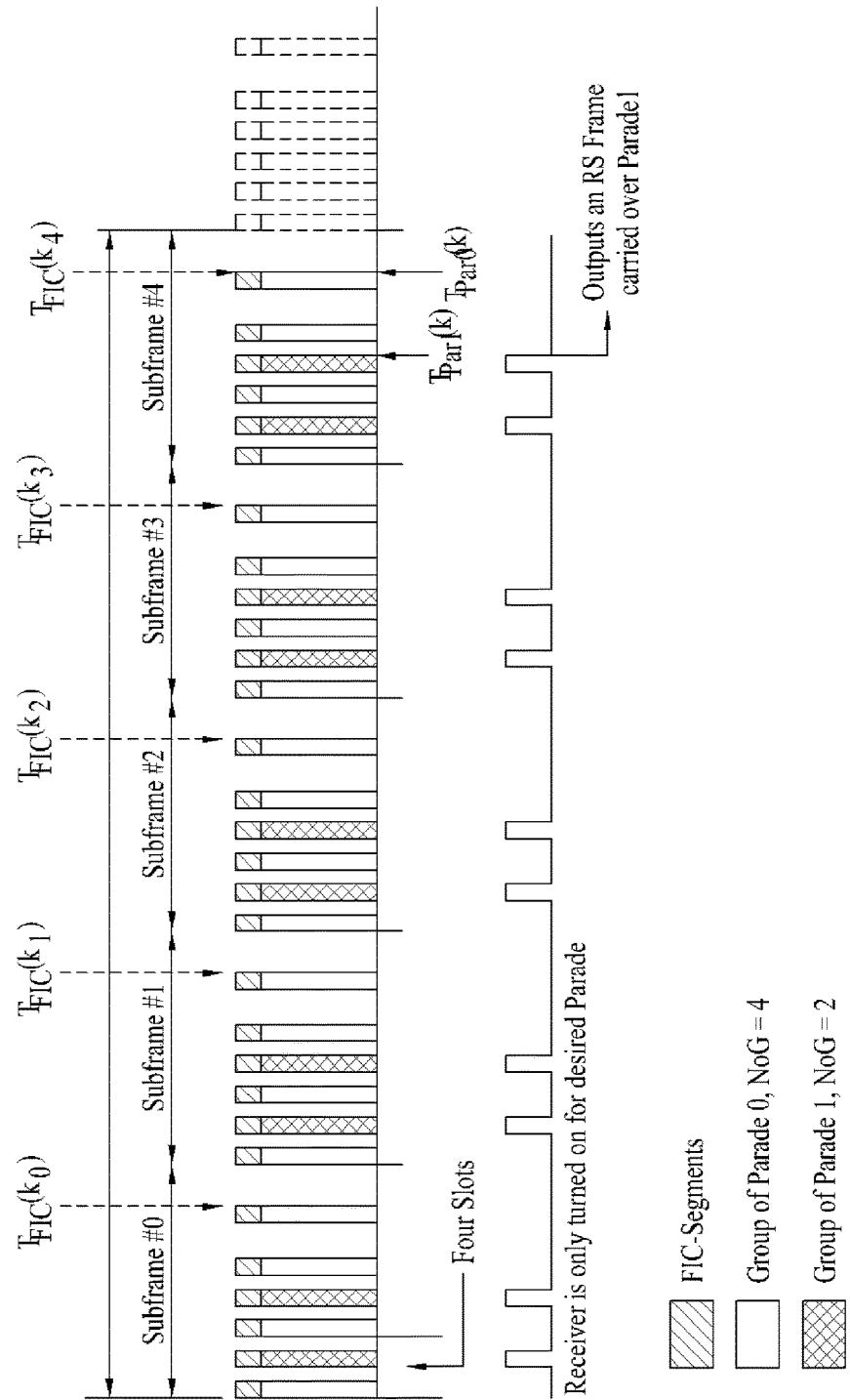
FIG. 9 is a view showing a data transmission structure in a physical layer according to an embodiment of the present invention.

FIG. 9 illustrates a data transmission structure in a physical layer according to an embodiment of the present invention. More specifically, FIG. 9 shows an example of FIC data being included in each data group and transmitted. As described above, an M/H frame for approximately 0.968 seconds is divided into 5 sub-frames, wherein data groups corresponding to multiple ensembles exist in combination within each sub-frame. Also, the data groups corresponding to each ensemble are interleaved in M/H frame units, so as to configure an RS frame belonging to one ensemble. In FIG. 9, 2 ensembles (wherein NoG=4 and NoG=3) exist in each sub-frame. Furthermore, a predetermined portion (e.g., 37 bytes/data group) of each data group is used for the purpose of separately delivering encoded FIC data apart from the RS frame data channel. The FIC region assigned to each data group consists of one FIC segment. Herein, each of the FIC segments is interleaved in sub-frame units. For example, RS-encoding and SCCC encoding processes are applied to the RS frame data, and RS encoding and PCCC encoding processes are applied to the FIC data. Also, as well as the FIC data, the RS encoding and PCCC encoding processes are applied to the TPC data. More specifically, (187+P,187)-RS encoding process is applied to the RS frame data, (51,37)-RS encoding process is applied to the FIC data, and (18,10)-RS encoding process is applied to the TPC. Herein, P is the number of parity bytes.

Hierarchical Signaling Structure

Figure 10:
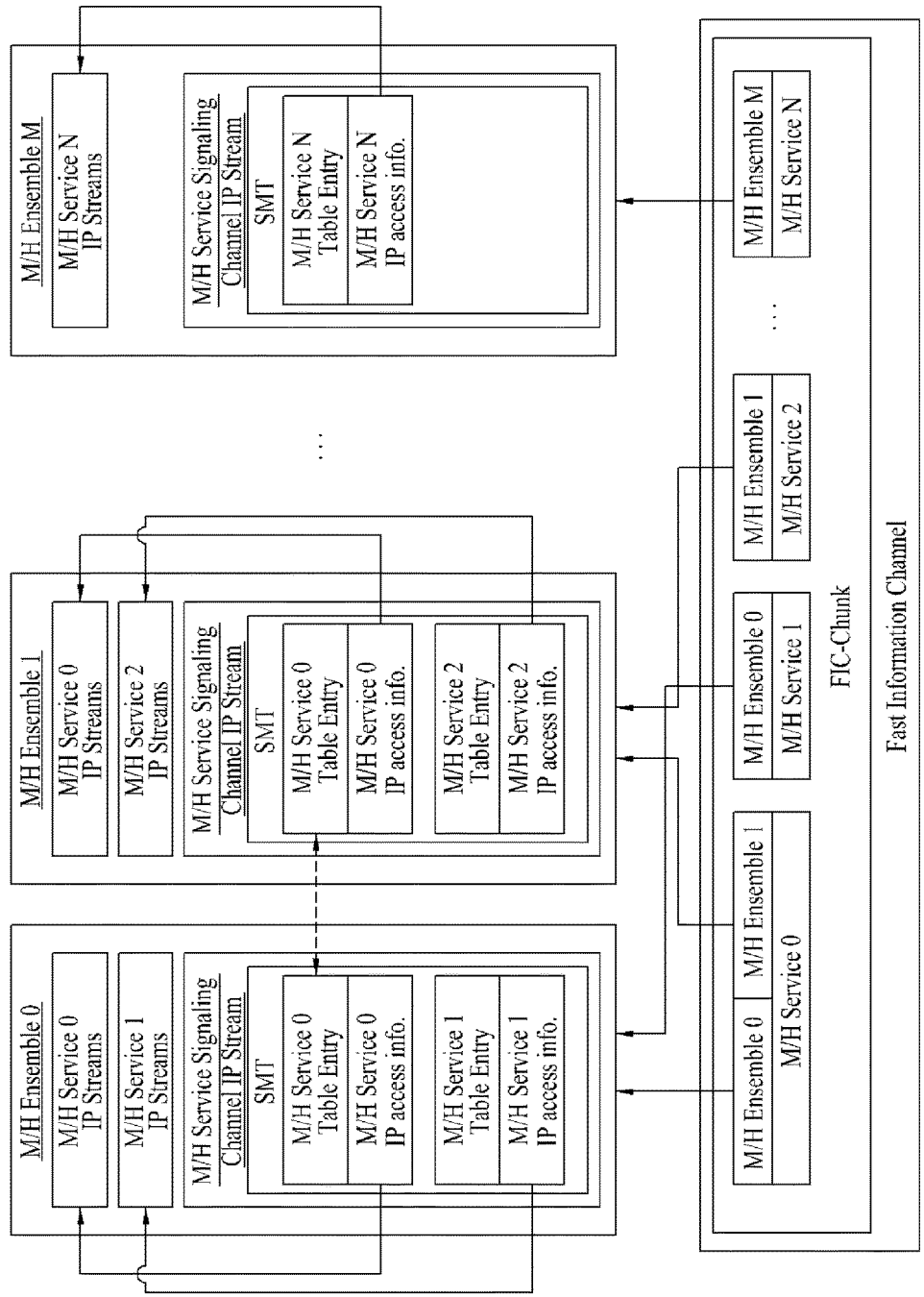
FIG. 10 is a view showing a hierarchical signaling structure according to an embodiment of the present invention.

FIG. 10 illustrates a hierarchical signaling structure according to an embodiment of the present invention. As shown in FIG. 10, the mobile broadcasting technology according to the embodiment of the present invention adopts a signaling method using FIC and SMT (Service Map Table). In the description of the present invention, the signaling structure will be referred to as a hierarchical signaling structure.

More specifically, FIG. 10 illustrates a hierarchical signaling structure that provides data required for service acquisition through an FIC chunk and a service map table (SMT), among IP-level mobile service signaling channels. As shown in FIG. 10, the FIC chunk uses its fast characteristic, so as to deliver a mapping relation between a service and an ensemble to the receiving system. More specifically, the FIC chunk quickly locates (or finds) an ensemble that can deliver a service requested by the receiving system, thereby providing the receiving system with signaling data that can enable the receiving system to swiftly receive RS frames of a respective ensemble.

A Service Map Table (SMT)

Next, signaling information of NRT services transmitted through the IP datagram in the RS frame of FIG. 6 will be described. Hereinafter, the SMT, which is one type of signaling information, will be described.

FIGS. 11 and 12 are views showing the bit stream syntax of an SMT configured according to an embodiment of the present invention.

In FIGS. 11 and 12, shown an example that the SMT is written in an MPEG format, by which the present invention is non-limited. Alternatively, the SMT can be defined in a different format.

The SMT describes service information and IP access information in an ensemble in which the SMT is transmitted, and also provides broadcast stream information of a service using Transport_Stream_ID which is an identifier of a broadcast stream to which each service belongs. The SMT according to the present embodiment contains description information of each mobile service in a single MH ensemble, and other supplementary information may be contained in a descriptor section.

Referring to FIGS. 11 and 12, an SMT section may be transmitted in a state of being included in an RS frame in an IP stream format. In this case, the RS frame decoders of the below-described receiver decode an input RS frame and output the decoded RS frame to RS frame handlers. Each of the RS frame handlers divides the input RS frame into rows, configures an MH TP, and outputs the MH TP to an MH TP handler.

An example of the fields that may be transmitted through the SMT will now be described.

A table_id file is an 8-bit unsigned integer number that indicates the type of table section being defined in Service Map Table (SMT).

A section_syntax_indicator field (1-bit) shall be set to '0' to always indicate that this table is derived from the short form of the MPEG-2 private section table.

A private_indicator field (1-bit) shall be set to '1'.

A section_length field (12-bit) specifies the number of remaining bytes this table section immediately following this field. The value in this field shall not exceed 4093 ('0xFFD').

A table_id_extension field (16-bit) is table-dependent. It shall be considered to be logically part of the table_id field providing the scope for the remaining fields. Herein, the table_id_extension field may include a SMT_protocol_version field.

A SMT_protocol_version field is an 8-bit unsigned integer field whose function is to allow, in the future, this NRT Service Map Table to carry parameters that may be structured differently than those defined in the current protocol. At present, the value for the SMT_protocol_version shall be zero. Non-zero values of SMT_protocol_version may be used by a future version of this standard to indicate structurally different tables.

An ensemble_id field is an 8-bit unsigned integer field in the range 0x00 to 0x3F shall be the Ensemble ID associated with this MH Ensemble. The value of this field shall be derived from the parade_id carried from the baseband processor of MH physical layer subsystem, by using the parade_id of the associated MH Parade for the least significant 7 bits, and using '0' for the most significant bit when the MH Ensemble is carried over the Primary RS frame, and using '1' for the most significant bit when the MH Ensemble is carried over the Secondary RS frame.

A version_number field (5 bits) represents version number of the SMT.

A current_next_indicator field is a one-bit indicator, which when set to '1' shall indicate that the Service Map Table sent is currently applicable. When the bit is set to '0', it shall indicate that the table sent is not yet applicable and will be the next table to become valid. This standard imposes no requirement that next tables (those with current_next_indicator set to '0') must be sent. An update to the currently applicable table shall be signaled by incrementing the version_number field.

A section_number field (8-bit) shall give the section number of this NRT Service Signaling table section. The section_number of the first section in an NRT Service Signaling table shall be '0x00'. The section_number shall be incremented by 1 with each additional section in the NRT Service Signaling table.

A last_section_number field (8-bit) shall give the number of the last section (i.e., the section with the highest section_number) of the Service Signaling table of which this section is a part.

A num_services field (8 bit) specifies the number of services in this SMT section.

According to one embodiment of the present invention, the NST provides information for a plurality of components using 'for' loop. Field information related to each service is provided as follows.

A service_id is a 16-bit unsigned integer number that shall uniquely identify this M/H Service within the scope of this MH Broadcast. The MH_service_id of a service shall not change throughout the life of the service. To avoid confusion, it is recommended that if a service is terminated, then the MH_service_id for the service should not be used for another service until after a suitable interval of time has elapsed.

A multi_ensemble_service field is a two-bit enumerated field that shall identify whether the M/H Service is carried across more than one M/H Ensemble. Also, this field shall identify whether or not the M/H Service can be rendered only with the portion of M/H Service carried through this M/H Ensemble.

A MH_service_status field is a 2-bit enumerated field that shall identify the status of this M/H Service. The most significant bit shall indicate whether this M/H Service is active (when set to '1') or inactive (when set to '0') and the least significant bit shall indicate whether this M/H Service is hidden (when set to '1') or not (when set to '0'). Hidden services are normally used for proprietary applications, and ordinary receiving devices should ignore them.

A SP_indicator field (1-bit) indicate, when set, that service protection is applied to at least one of the components needed to provide a meaningful presentation of this M/H Service.

A short_service_name_length field is a three-bit unsigned integer that shall indicate the number of byte pairs in the short_service_name field. This value is shown as m in the No. of Bits column for the short_service_name field. When there is no short name of this M/H service, the value of this field shall be '0'.

A short_service_name field is the short name of the M/H Service, each character of which shall be encoded. When there is an odd number of bytes in the short name, the second byte of the last of the byte pair per the pair count indicated by the short_service_name_length field shall contain '0x00'.

An MH_service_category field is a 6-bit enumerated type field that shall identify the type category of service carried in this M/H Service as defined in Table 5. When the value of this field is set to the value which is indicated Informative only, the value of this field shall be treated as an informative description to the category of service, and the receiver is required to examine the component_level_descriptors( ) of the SMT-MH to identify the actual category of service carried through this M/H Service. For services that have a video and/or audio component, they shall have an NTP timebase component.

If the value of the field is, for example, '0x0E', it can be seen that the mobile service is a mobile NRT service. Accordingly, the receiver determines that the mobile service is an NRT service if the value of the MH_service_category field is '0x0E' and, as a result, should check the component_descriptor of a component level containing information about a FLUTE session in which the identified NRT service is transmitted. In the checking of component_descriptor, if the value of the component_type field in the descriptor is '38', information about the FLUTE session received by component data is extracted.

TABLE 2

| Value | Encapsulated Protocol |
| --- | --- |
| 0x00 | Not in a MPEG-2 Transport Stream |
| 0x01 | Asynchronous non-flow controlled scenario of the DSM-CC Download protocol encapsulated in DSM-CC sections |
| 0x02 | Non-streaming Synchronized Download protocol encapsulated in DSM-CC sections |
| 0x03 | Asynchronous multiprotocol datagrams in Addressable Sections using LLC/SNAP header |
| 0x04 | Asynchronous IP datagrams in Addressable Sections |
| 0x05 | Synchronized streaming data encapsulated in PES |
| 0x06 | Synchronous streaming data encapsulated in PES |
| 0x07 | Synchronized streaming multiprotocol datagrams in PES using LLC/SNAP header |
| 0x08 | Synchronous streaming multiprotocol datagrams in PES using LLC/SNAP header |
| 0x09 | Synchronized streaming IP datagrams in PES |
| 0x0A | Synchronous streaming IP datagrams in PES |
| 0x0B | Proprietary Data Piping |
| 0x0C | SCTE DVS 051 asynchronous protocol [19] |
| 0x0D | Asynchronous carousel scenario of the DSM-CC Download protocol encapsulated in DSM-CC sections |
| 0x0E | Reserved for harmonization with another standard body |
| 0x0F-0x7F | ATSC reserved |
| 0x80-0Xff | User defined |

A num_components field (5-bit) specifies the number of IP stream components in this M/H Service.

An IP_version_flag field is a 1-bit indicator, which when set to 0 shall indicate that source_IP_address, MH_service_destination_IP_address, and component_destination_IP_address fields are IPv4 addresses. The value of 1 for this field is reserved for possible future indication that source_IP_address, MH_service_destination_IP_address, and component_destination_IP_address fields are for IPv6. Use of IPv6 addressing is not currently defined.

A source_IP_address_flag field is a 1-bit Boolean flag that shall indicate, when set, that a source IP address value for this M/H Service is present to indicate a source specific multicast.

An MH_service_destination_IP_address_flag field is a 1-bit Boolean flag that indicates, when set to 1, that a MH_service_destination_IP_address value is present, to serve as the default IP address for the components of this M/H Service.

A source_IP_address field shall be present if the source_IP_address_flag is set to 1 and shall not be present if the source_IP_address_flag is set to 0. If present, this field shall contain the source_IP_address of all the IP datagrams carrying the components of this M/H Service. The conditional use of the 128 bit-long address version of this field is to facilitate possible use of IPv6 in the future, although use of IPv6 is not currently defined.

A MH_service_destination_IP_address field shall be present if the MH_service_destination_IP_address_flag is set to 1 and shall not be present if the MH_service_destination_IP_address_flag is set to 0. If this MH_service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined.

According to an embodiment of the present invention, the SMT provides information for a plurality of components using a 'for' loop.

An essential_component_indicator field is a one-bit indicator which, when set to 1, shall indicate that this component is an essential component for the M/H Service. Otherwise, this field indicates that this component is an optional component.

A component_destination_IP_address_flag field is a 1-bit Boolean flag that shall indicate, when set to 1, that the component_destination_IP_address is present for this component.

A port_num_count field shall indicate the number of destination UDP ports associated with this UDP/IP stream component. The values of the destination UDP port numbers shall start from the component_destination_UDP_port_num field and shall be incremented by one, except in the case of RTP streams, when the destination UDP port numbers shall start from the component_estination_UPD_port_num field and shall be incremented by two, to allow for the RTCP streams associated with the RTP streams.

A component_destination_UDP_port_num field (16-bit unsigned integer) represents the destination UDP port number for this UDP/IP stream component. For RTP streams, the value of component_estination_UDP_port_num shall be even, and the next higher value shall represent the destination UDP port number of the associated RTCP stream.

A component_destination_IP_address field shall be present if the component_destination_IP_address_flag is set to 1 and shall not be present if the component_destination_IP_address_flag is set to 0. When this field is present, the destination address of the IP datagrams carrying this component of the MH Service shall match the address in this field. When this field is not present, the destination address of the IP datagrams carrying this component shall match the address in the MH_service_destination_IP_address field. The conditional use of the 128 bit-long address version of this field is to facilitate possible use of IPv6 in the future, although use of IPv6 is not currently defined.

A num_component_level_descriptors field (4 bit) specifies the number of component_level_descriptors for this component.

A component_level_descriptor( ) field may have one or more descriptors providing additional information for this IP stream component, may be included.

A num_MH_service_level_descriptors field (4 bit) specifies the number of service level descriptors for this service.

A MH_service_level_descriptor( ) has zero or more descriptors providing additional information for this M/H Service, may be included.

A num_ensemble_level_descriptors field (4 bit) specifies the number of ensemble level descriptors for this ensemble.

An ensemble_level_descriptor( ) is zero or more descriptors providing additional information for the M/H Ensemble which this SMT-MH describes, may be included.

The Source_IP_address becomes a source IP address of the same server for transmitting all the channels of the FLUTE session if the service is an NRT service.

The MH_service_destination_IP_Adress is signaled if a destination IP address having the session level of this FLUTE session is present.

The component may be mapped to a channel in the FLUTE session, and a separate destination IP address (different from an IP address signaled in the session units) may be signaled through component_destination_IP_address according to channels. In addition, a destination port number may be signaled through component_destination_UDP_port_num, and the destination port number started from component_destination_UDP_port_num may be further specified through port_num_count.

An OMA-BCAST Service Guide

Figure 13:
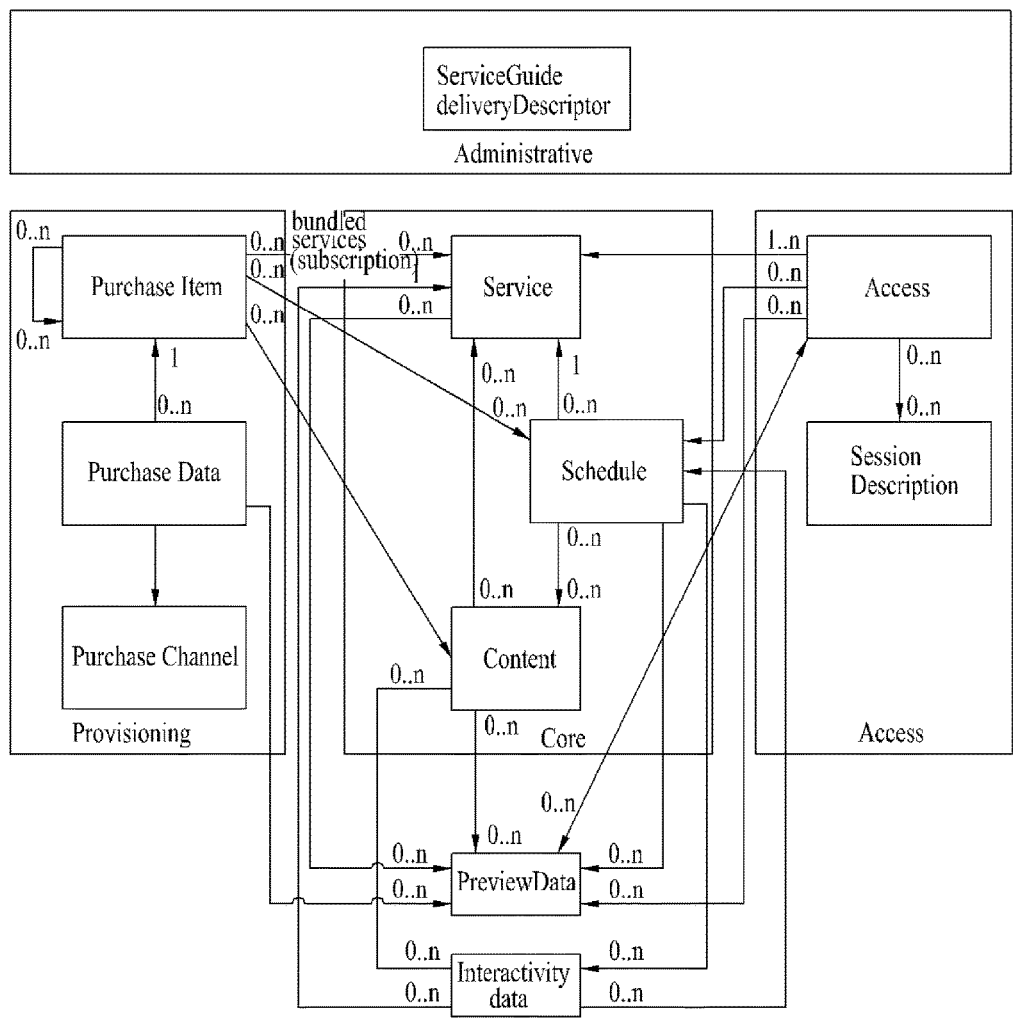
FIG. 13 is a view showing the structure of a Service Guide (SG) according to an embodiment of the present invention.

FIG. 13 illustrates the structure of a service guide according to the present invention.

The provisioning group corresponds to a group providing information on the fees charged for receiving services. Herein, the provisioning group includes a purchase item fragment, a purchase data fragment, and a purchase channel fragment. The core group corresponds to a group providing information on the service itself. Herein, the core group includes a service fragment, a schedule fragment, and a content fragment. The access group includes an access fragment and a session description fragment. In addition to the above-described groups, the service guide may also include a previewData fragment and an interactiveData fragment. The arrows shown in FIG. 13 indicate the reference relation between each fragment. According to the example shown in FIG. 13, the schedule fragment, the content fragment, the purchase item fragment, and the access fragment may refer to the service fragment. And, the schedule fragment may refer the service fragment and the content fragment. The numbers shown above each arrow in FIG. 13 respectively indicate the available number of lower-level unit information. Also, these numbers indicate the available number of fragments.

The essential fragments among the above-mentioned fragments will now be described in detail.

The service fragment includes information on a service provided to a user (e.g., information on a service such as a conventional television channel).

The content fragment includes metadata on the corresponding content. For example, a content type, such as A/V data, text data, image data, may be included in the content fragment.

Also, the NRT service guide data is acquired from the service fragment, the schedule fragment and the content fragment. In this case, the acquired NRT service guide data may include content version, content_id, content available time and so on.

The schedule fragment includes schedule information on a single content within the provided service. For example, a broadcast time of the corresponding content may correspond to the schedule information.

The purchase item fragment includes item information associated with purchasing.

The purchase data fragment includes information associated with the purchase of a service, which may be purchased by the user. The purchase channel fragment indicates an interface used by the user or a terminal in order to communicate with a purchase system. The purchase channel fragment includes one of a parameter associated with the purchase system and information on managing a purchase channel.

The access fragment includes information associated with accessing a service or content.

A Mobile NRT Service Signaling Architecture

The signaling of information about individual M/H NRT content items is done at two levels:

First, the File Delivery Table (FDT) of the FLUTE sessions used to deliver the items lists all the content items and gives their sizes, data types, and other information relevant to the acquisition of the items.

Second, the OMA BCAST Service Guide (SG) gives more detailed descriptive information about the items and their delivery schedules).

An NRT_Component_Descriptor( )

Content items/files for an NRT service are transferred through FLUTE and corresponding FLUTE session information is signaled using access information in the SMT table.

FIG. 14 is an exemplary diagram for a bit-stream syntax of NRT_component_descriptor( ) configured according to one embodiment of the present invention.

An NRT_component_descriptor( ) shall appear in the component descriptor loop of each component of each NRT Service in the SMT and all parameters in the descriptor shall correspond to the parameters in use for that component of the NRT Service.

In the following description, each field carried on NRT_component_descriptor shown in FIG. 13 is described.

A descriptor_tag field (8-bit unsigned integer) shall have the value, identifying this descriptor as the NRT_component_descriptor.

A descriptor_length field (8-bit unsigned integer) shall specify the length (in bytes) immediately following this field up to the end of this descriptor.

A component_type field (7-bit) shall identify the encoding format of the component. The value may be any of the values assigned by IANA for the payload_type of an RTP/AVP stream [10], or it may be any of the values in Table 3 assigned by this document, or it may be a "dynamic value" within the range of 96 to 127. For components consisting of media carried via RTP, the value of this field shall match the value in the payload_type field in the RTP header of the IP stream carrying this component.

Note that additional values of the component_type field within the range of 43 to 71 can be defined in future versions of this standard. The NRT service stream transmitted through FLUTE protocol further requires parameters to signal a FLUTE session as a Table 3. In the Table 3, '38' of component_type being defined for FLUTE component in the ATSC or '43' of component_type newly being defined for transmission NRT may be used.

TABLE 3

| component_type | Meaning |
| --- | --- |
| 0-34 | Assigned or reserved by IANA, except that 20, 4, 27, and 29-30 are unassigned |
| 35 | H.264/AVC video stream component (assigned by ATSC use) |
| 36 | SVC enhancement layer stream component (assigned by ATSC use) |
| 37 | HE AAC v2 audio stream component (assigned by ATSC use) |
| 38 | FLUTE file delivery session (assigned by ATSC use) |
| 39 | STKM stream component (assigned by ATSC use) |
| 40 | LTKM stream component (assigned by ATSC use) |
| 41 | OMA-RME DIMS stream component (assigned by ATSC use) |

TABLE 3-continued

| component_type | Meaning |
| --- | --- |
| 42 | NTP timebase stream component (assigned by ATSC use) |
| 43-71 | [Unassigned by IANA and reserved by ATSC use] |
| 72-76 | Reserved by IANA |
| 77-95 | Unassigned by IANA |
| 96-127 | Designated by IANA for dynamic use |

A num_STKM_streams field (8-bit unsigned integer) shall identify the number of STKM streams associated with this component.

A STKM_stream_id field (8-bit unsigned integer) shall identify an STKM stream where keys to decrypt this protected component can be obtained, by reference to the STKM_stream_id in the component descriptor for the STKM stream.

An NRT_component_data (component_type) provides the encoding parameters and/or other parameters necessary for rendering this component. The structure of the NRT_component_data is determined by the value of component_type field.

The File Delivery Table (FDT) of the FLUTE sessions used to deliver the items lists all the content items and gives their sizes, data types, and other information relevant to the acquisition of the items.

For example, the receiver may configure and display a service guide using an OMA BCAST SG. The receiver acquires information for accessing a FLUTE session in which content selected from the displayed service guide is transmitted. In addition, the receiver receives a file by mapping information about the transmitted file through the file information (FDT) in the accessed FLUTE session based on the access information acquired from the SMT to the content identifier of the OMA BCAST SG. The content identifier of the OMA BCAST SG may contain globalContentID for globally and uniquely identifying a content item using XML or NRT_content_id which is separately defined in association with an NRT service, and conversion thereof is necessary for mapping with the file information in the FLUTE session, which is the value of a binary type. The conversion process will be described in detail later and will be omitted herein.

In order to signal the FLUTE session, parameters are necessary. Such parameters include necessary parameters and parameters which are selectively necessary in association with the FLUTE session. First, the necessary parameters include a "source IP address" parameter, a "number of channels in the session" parameter, a "destination IP address and port number for each channel in the session" parameter, a "Transport Session Identifier (TSI) of the session" parameter and a "start time and end time of the session" parameter, and the parameters which are selectively necessary in association with the FLUTE session include an "FEC object transmission information" parameter, a "some information that tells receiver in the first place, that the session contains files that are of interest", and a "bandwidth specification" parameter.

The "number of channels in the session" parameter may be explicitly provided or may be obtained by summing the number of streams configuring the session. Among the parameters, the "start time and end time of the session" parameter may be signaled through the SMT suggested by the present invention, and the "source IP address" parameter, the "destination IP address and port number for each channel in the session" parameter, the "Transport Session Identifier (TSI) of the session" parameter and the "number of channels in the session" parameter may be signaled through session_description_descriptor.

NRT_Component_Data

FIG. 15 is a diagram for a bit-stream syntax of NRT_component_data descriptor for FLUTE file delivery configured according to an embodiment of the present invention.

A single NRT service may contain multiple FLUTE sessions. Each session may be signaled using one or more FLUTE component descriptors, depending on the IP addresses and ports used for the sessions.

In the following description, each field of NRT_component_data descriptor is explained in detail.

A TSI is a 16-bit unsigned integer field, which shall be the Transport Session Identifier (TSI) of the FLUTE session.

A session_start_time indicates the time at which the FLUTE session starts. If the value of this field is set to all zero, then it shall be interpreted to mean that the session has already started.

A session_end_time indicates the time at which the FLUTE session ends. If the value of this field is set to all zero, then it shall be interpreted to mean that the session continues indefinitely.

A tias_bandwidth_indicator is a 1-bit field that flags the inclusion of TIAS bandwidth information. This bit shall be set to 1 to indicate the TIAS bandwidth field is present, and it shall be set to 0 to indicate the TIAS bandwidth field is absent.

An as_bandwidth_indicator is a 1-bit field that flags the inclusion of AS bandwidth information. This bit shall be set to 1 to indicate the AS bandwidth field is present, and it shall be set to 0 to indicate the AS bandwidth field is absent.

A FEC_OTI_indicator is a 1-bit indicator that indicates whether FEC Object Transmission Information is provided.

A tias_bandwidth field has a value. This value shall be one one-thousandth of the Transport Independent Application Specific maximum bandwidth, rounded up to the next highest integer if necessary. (Note: this gives the TIAS bandwidth in kilobits per second).

An as_bandwidth has a value. This value shall be the Application Specific maximum bandwidth. (Note: this gives the AS bandwidth in kilobits per second).

A FEC_encoding_id field identifies a FEC encoding ID used in this FLUTE session.

A FEC_instance_id field identifies a FEC instance ID used in this FLUTE session.

By signaling the above described parameters via FLUTE component data bytes, it is able to provide all information mandatory to receive a FLUTE session. And, it is able to use a method of receiving FDT via this session, obtaining information all files carried on a FLUTE session via the received FDT and receiving these files.

This FLUTE component descriptor can be delivered via component_level_descriptor loop of NST. In case that there is a plurality of FLUTE channels, such parameters at a session level as TSI, session_start_time, session_end_time and the like should be signaled only once. Hence, one of the components of several channels can transmit a FLUTE component descriptor via Component_level_descriptor loop.

A Relationship Among M/H Service, FLUTE Session and NRT Service

Figure 16:
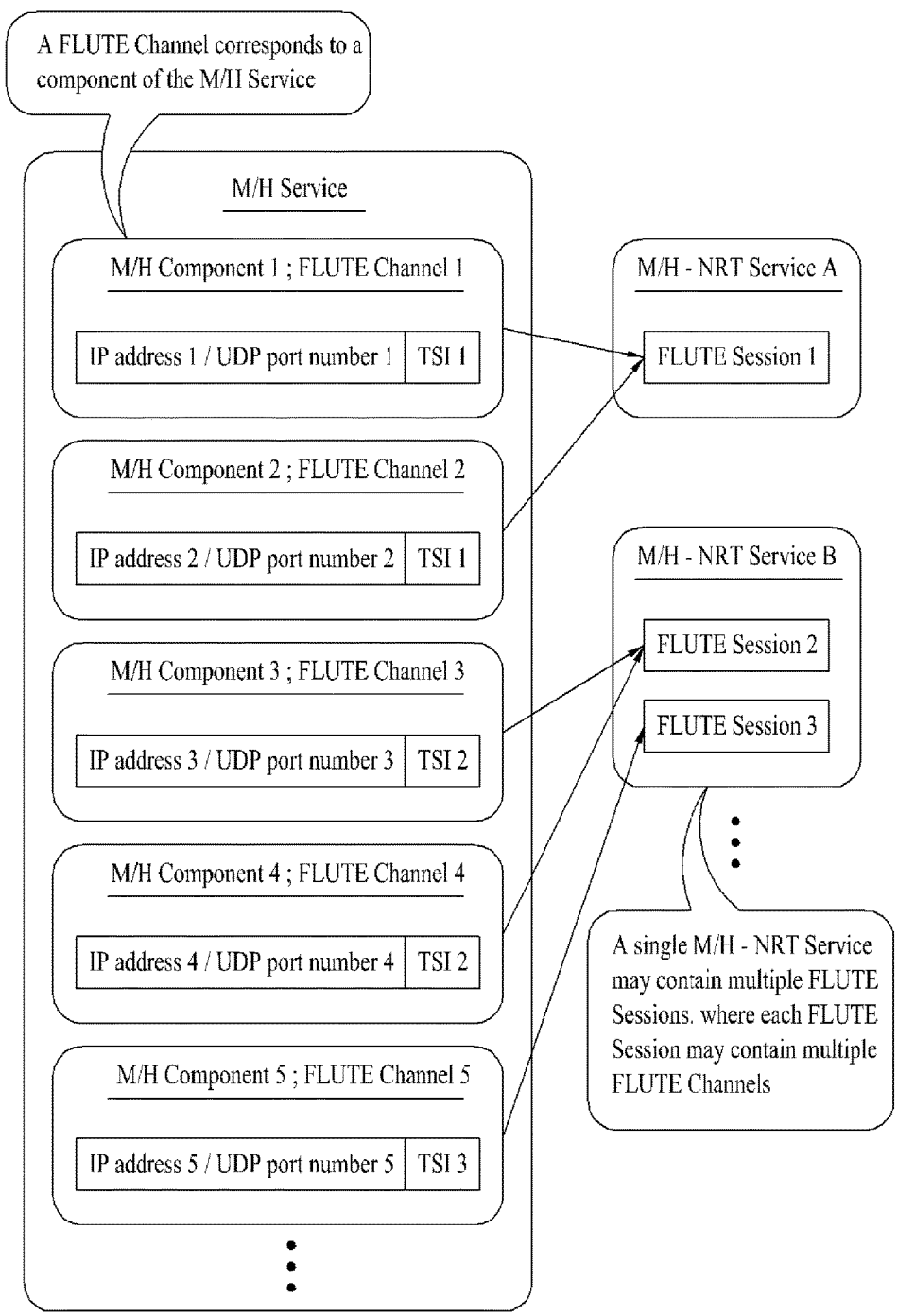
FIG. 16 is a view explaining a relationship among an M/H service, a FLUTE session and an NRT service according to the present invention.

FIG. 16 is a view explaining a relationship among an M/H service, a FLUTE session and an NRT service according to the present invention.

The M/H services include one or more M/H components and each of the M/H services is transmitted through a FLUTE channel. The FLUTE channel corresponds to an MH service component. In addition, a single M/H NRT service contains multiple FLUTE sessions and each of the FLUTE sessions contains multiple FLUTE channels. The MH component may be defined by a single destination IP address and a single UDP port number.

For example, an MH NRT service A includes a FLUTE session 1, the FLUTE session 1 is indicated by TSI 1 information of an MH component 1 and an MH component 2 of the MH services. In addition, an MH NRT service B contains FLUTE sessions 2 and 3. The FLUTE session 2 is indicated by TSI 2 information of an MH component 3 and an MH component 4 of the MH services, and the FLUTE session 3 is indicated by TSI 3 information of an MH component 5.

A FDT Schema

FIG. 17 is an exemplary diagram to explain a FDT schema for mapping a file to content_id according to an embodiment of the present invention, and FIG. 18 is an exemplary diagram to explain a FDT schema for mapping a file to content_id according to another embodiment of the present invention, which represents a FDT instant level entry file designating method.

In the following description, a FDT instance level refers to a level containing a portion, in which the common attribute is defined, if the common attribute of all files declared in the FDT needs to be defined. The FDT file level is used to indicate a level containing definition of the individual attribute of each of the files.

The receiver identifies whether transferred service via corresponding channel is an NRT service based upon the NST and NCT. Also, the receiver identifies content items and files of corresponding NRT service.

As mentioned in the foregoing description, the receiver may identify files and content items in the fixed NRT service. However, the receiver can not be matched the files to the content items because of not having information on mapping the files to the content items. Accordingly, the receiver can not process the received fixed NRT service.

Therefore, the present invention can provide a method for mapping the files to the content items. In this case, the receiver can properly process the received fixed NRT services. In this disclosure, the method may be specified based on the FDT information in the FLUTE session transmitting fixed NRT services. For instance, each file constructing the content items is identified based on content-location and TOI field specified in the FLUTE session. Moreover, the TOI field or content-location field and content item is corresponded to be matched a content identifier in the FDT with the content_id field in the NCT.

Referring to FIGS. 17 and 18, a part indicated by #1 declares content_id at FDT-Instance level. In this case, the declared content_id is given to all files declared within the corresponding FDT-Instance. Of course, by newly giving content_id at a file level, it is able to overdrive this information. Alternatively, if a specific file belongs to another content item instead of a content item defined at the FDT-Instance level, this can be announced by giving a file level content_id that will be explained in the following description. In the present embodiment, content_id is represented using 16 bits.

A part indicated by #2 declares content_id at a file level. If a file included within FDT Instance belongs to a different content item, it is signaled that each file belongs to a prescribed content item using this method.

A part indicated by #3 is a method for informing each file whether the corresponding file is an entry file. In particular, a file, which is played back in the first place, or a file corresponding to a root file, which should be executed first to access a content item, among several files constructing a content item is called an entry file. This part indicates a method of announcing this information. It is able to omit 'entry' attribute. If it is omitted as 'false', a basic value means that a corresponding file is not an entry file.

By signaling a presence or non-presence of an entry according to a group belonging at a file level, a specific file plays a role as an entry in a specific group but may fail to play the role in another group.

Regarding an embodiment of an entry file, if a content item is constructed as a web page, assume that index.htm and other several associated pictures and text files exist, the index.htm becomes the entry file.

As a method of announcing a presence or non-presence of an entry file in case of granting content identifier at FDT-instance level, the following two kinds of methods can be taken into consideration.

1) Method of granting File-level content identifier to a file corresponding to an entry file in addition and setting its entry attribute to 'true': In this case, it is disadvantageous in that content identifier is overlapped at FDT-Instance level and file level. Yet, this case can provide a most flexible structure.

Figure 20:
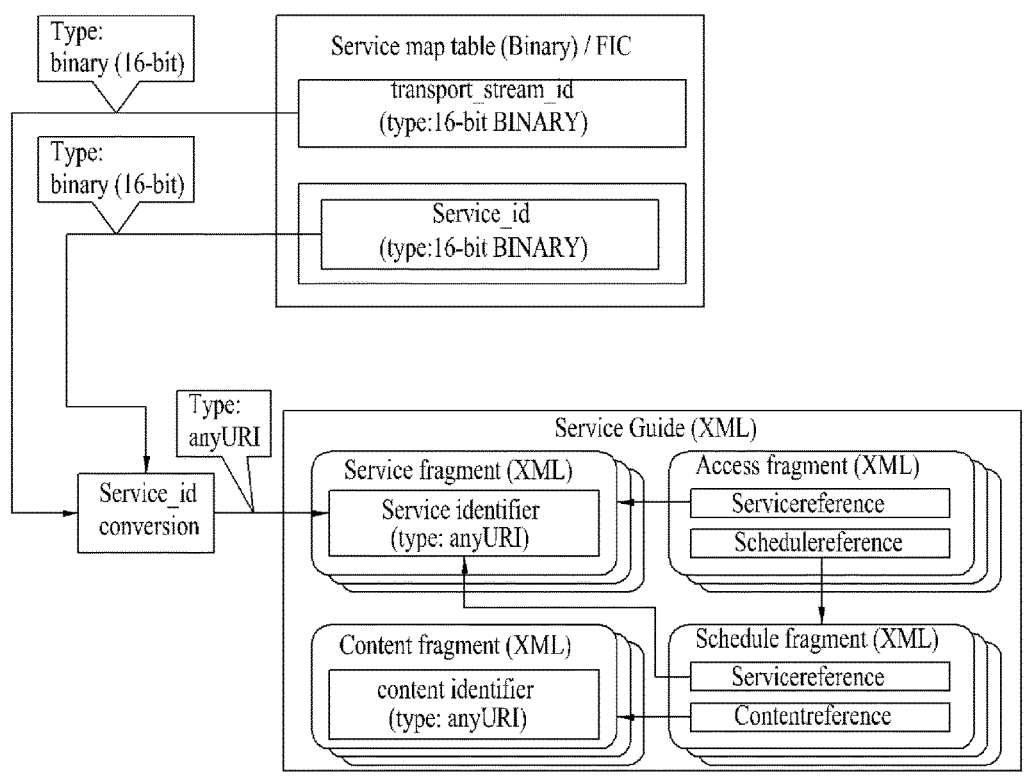
FIG. 20 is a view explaining a connection process for converting and mapping Service Map Table (SMT) data and Open Mobile Alliance (OMA) Mobile Broadcast Services Enabler Suite (BCAST) Service Guide (SG) data according to an embodiment of the present invention.

2) It is able to consider a method of directly referencing files playing a role as an entry file in the content identifier definition at FDT-instance level like another embodiment of the FDT scheme shown in FIG. 20. For this, in the embodiment shown in FIG. 20, FDT-Content-ID-Type is separately defined for FDT-instance level content identifier. This is extended to include a content location of an entry file as indicated by #2.

In case of this method, it may be disadvantageous in that a content location is repeatedly signaled. But, it becomes advantageous in that entry file configuring information can be directly obtained per content item.

A Mapping of SMT, FDT and OMA-BCAST SG

FIG. 19 is a block diagram showing an example of a receiver used for mapping of signaling information configured according to an embodiment of the present invention.

According to the present invention, a mobile broadcast receiver tunes to a desired ensemble and then extracts and processes an SMT of RS frame data of the ensemble. The extracted/processed SMT contains information necessary for mapping of a mobile service (or an NRT service) and IP access information and acquisition of an IP stream component of the mobile service (or NRT service) in the form of a table or descriptor. In addition, the SMT is transmitted in a state of being divided into sections, and the sections may be individually processed. A single SMT section contains virtual channel information of the ensemble in which the SMT sections are transmitted. Each of the SMT sections is divided into ensemble_id and section_number. Each of the SMT sections is encapsulated by UDP/IP, and an IP address and a UDP port number use well-known values such that the mobile broadcast receiver can receive the SMT sections without separate IP access information. Each of the SMT sections is transmitted in binary form, and the mobile broadcast receiver processes the SMT sections in binary form.

The data of each of the SMT sections is basically in binary form and the data of the OMA-BCAST SG is in XML form. Accordingly, in order to enable such data to be used for mapping, such data should be converted. That is, the mobile broadcast receiver converts data elements of the SMT sections in binary form into XML form so as to maintain consistency with the OMA-BCAST SG. The SMT in binary form is processed by an SMT binary parser in a handler, is stored in storage 124, is extracted from the storage 124 for mapping, is converted into XML form by an SMT converter, and is input to an SG handler 165. When the OMA-BCAST SG in XML form is input to the SG handler 165, mapping is performed using both data.

The conversion process for mapping both data will now be described in detail.

Figure 22:
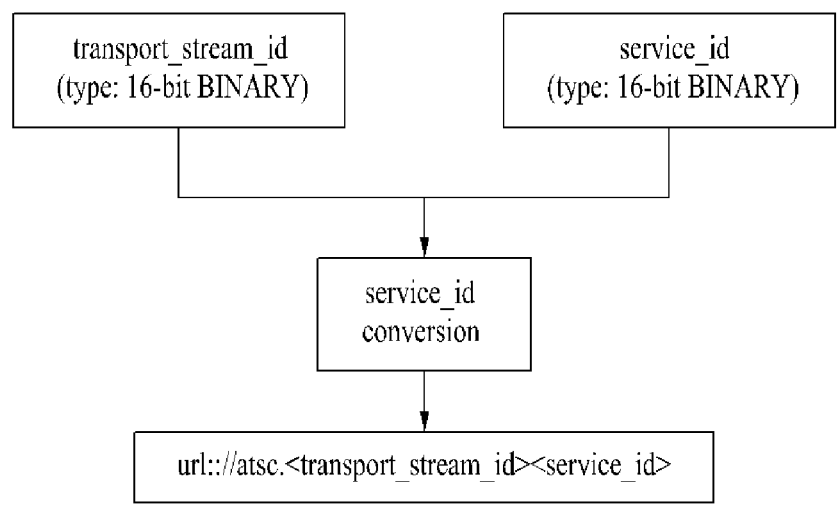
FIG. 22 is a view illustrating a method of converting service_id.

FIG. 20 is a view explaining a connection process for converting and mapping SMT data to OMA-BCAST SG data according to an embodiment of the present invention, and FIG. 22 is a view illustrating a method of converting service_id.

Referring to FIGS. 20 and 22, the mobile broadcast receiver converts the SMT section in binary type into XML form, for mapping.

For example, transport_stream_id in the FIC and service_id of the 16-bit binary form in the SMT are combined, are converted into an anyURI form, and are mapped with a service identifier (e.g., globalServiceID) on the OMA-BCAST SG. The converted anyURI form may be, for example, a format such as URI:://atsc.<transport_stream_id><service_id>. Accordingly, the receiver may search for a service fragment using the service identifier (e.g., globalServiceID) on the OMA-BCAST SG.

In addition, a content identifier (e.g., globalContentID or NRT_content_id) on the OMA-BCAST SG is mapped with based on content_id in the FDT. Accordingly, the receiver may search for a content fragment and a schedule fragment which refers to the content fragment in the OMA-BCAST SG, using the mapping. In addition, content_id in the FDT may be, for example, a 16-bit binary number.

Therefore, according to the present invention, an MH reception system which is a mobile broadcast system may convert the SMT and the FDT in binary form transmitted through a well-known IP address and UDP port number into XML form and map them to information corresponding to the OMA-BCAST SG originally transmitted in XML form so as to maintain consistency.

An NRT Signaling Architecture Description

Figure 21:
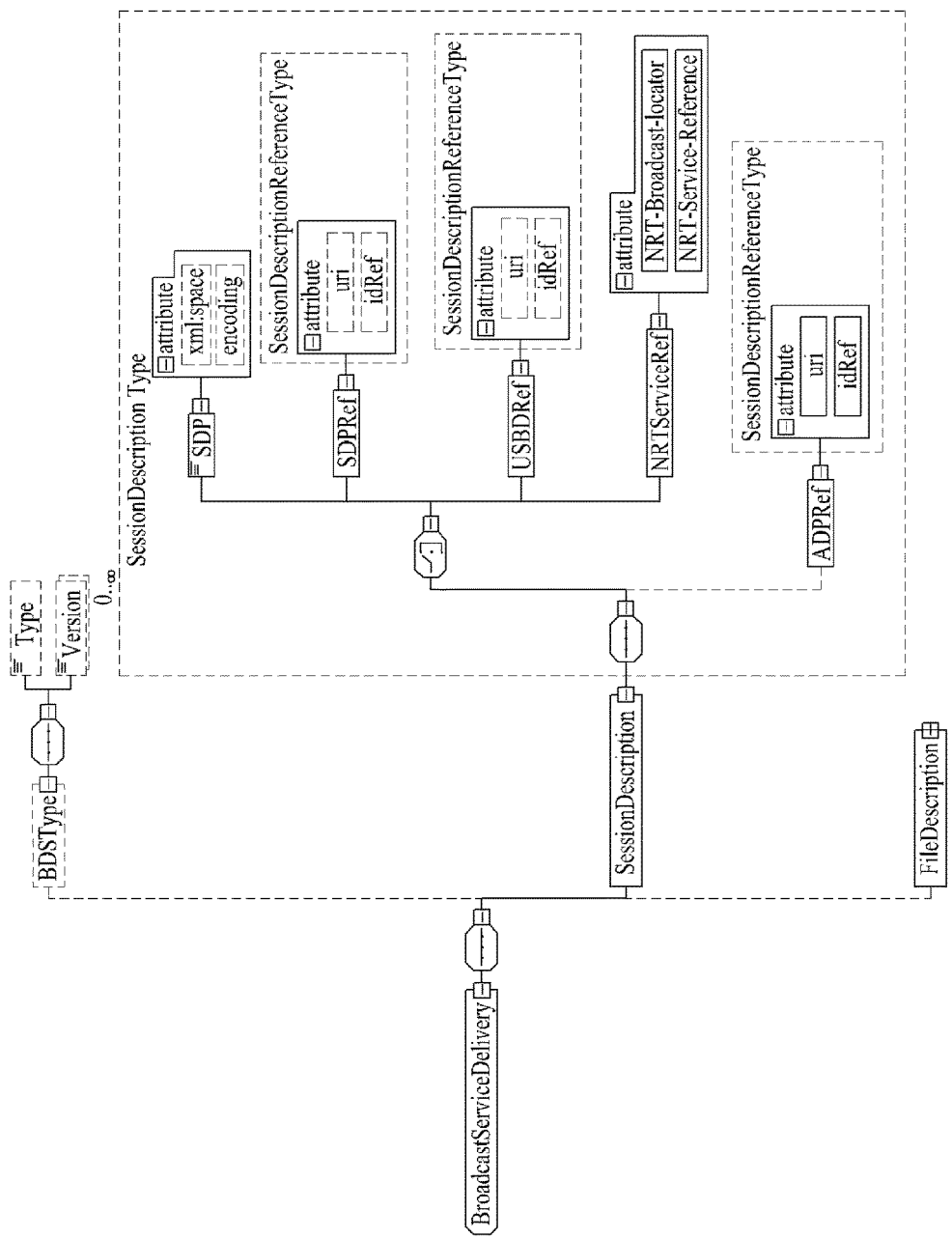
FIG. 21 is a view explaining an Extensible Markup Language (XML) schema of OMA BCAST SG broadcast service delivery for providing access information through an NRT service according to an embodiment of the present invention.

FIG. 21 is a view explaining SML schema of an OMA BCAST SG broadcast service delivery for providing access information through an NRT service according to an embodiment of the present invention.

In the above-described process, in order to signal access information of a service transmitted through the NRT service in an access fragment of the BCAST SG, the following method may be used.

The access information for the service delivery through a broadcast is provided through a broadcast service delivery structure. As shown in FIG. 21, the access information of the service delivered through the NRT service may be provided. As a method for session description, if an NRTServiceRef element is added to provide the access information of the NRT service, the NRT service access information on the SMT is referred to and used by referring to the NRT service.

As shown in FIG. 21, a method of using an NRT-Broadcast-Locator as a Universal Resource Identifier (URI) for uniquely identifying an ensemble carried by the NRT service and providing an NRT service ID through an NRT-Service-Reference so as to uniquely identify the NRT service can be implemented.

The NRT-Broadcast-Locator is extended as follows such that the NRT service can be identified by a single URI.

atsc://f=<frequency>.<program_number>[.m=<modulation_format>][/<NRT_service_ID>]

The NRT service may be uniquely identified by the single URI by containing the NRT service ID in the URI.

A Method of Providing NRT Service

Figure 23:
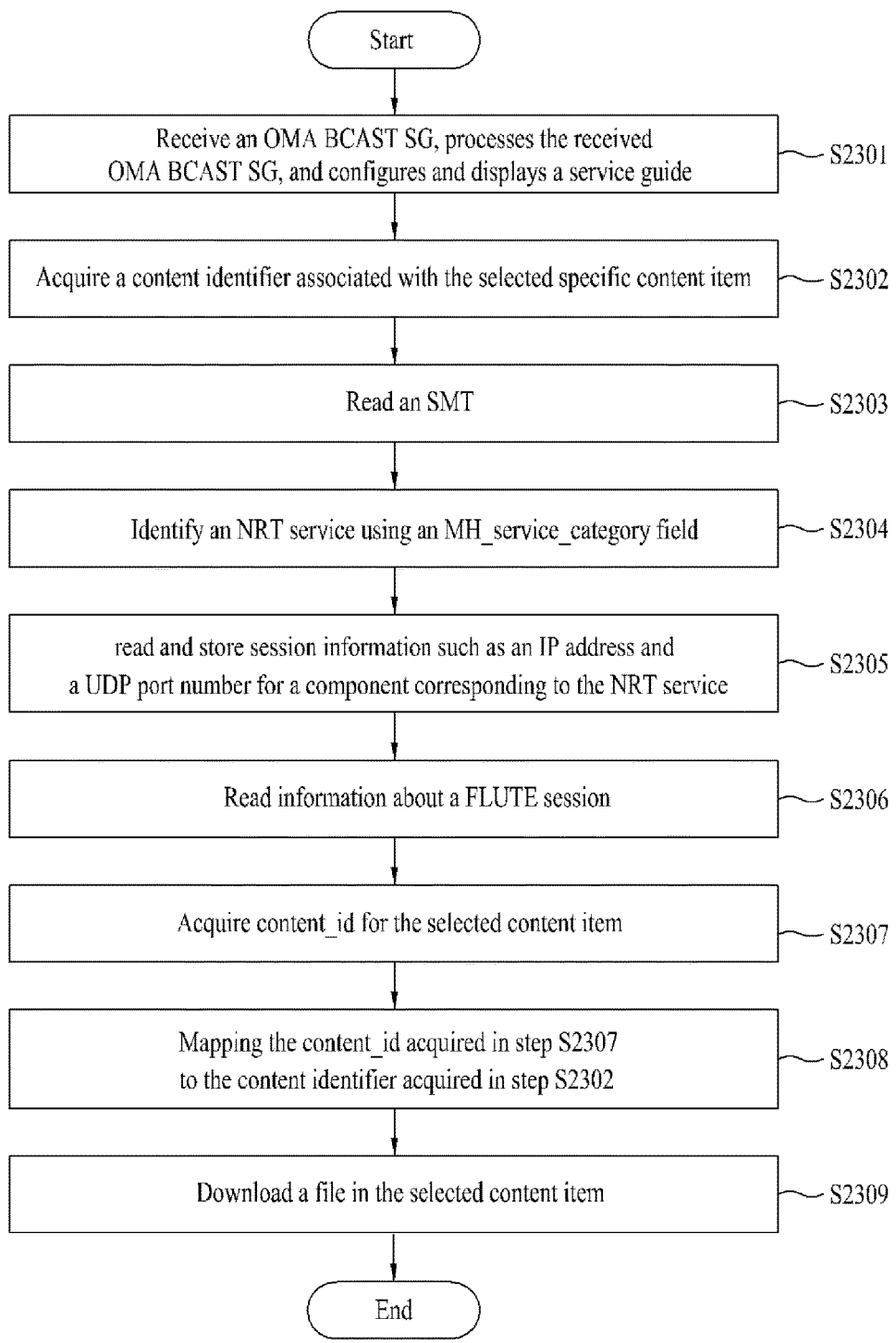
FIG. 23 is a flowchart illustrating a method of providing an NRT service according to an embodiment of the present invention.

FIG. 23 is a flowchart illustrating a method of providing an NRT service according to an embodiment of the present invention.

The receiver receives an OMA BCAST SG, processes the received OMA BCAST SG, and configures and displays a service guide (S2301).

When a user or the like selects a specific content item in at least one mobile NRT service from the displayed service guide, a content identifier associated with the selected specific content item is acquired (S2302).

The receiver processes and reads an SMT of signaling information in order to receive the selected specific content item (S2303).

If an M/H service contains single or multiple M/H NRT services, an MH_service_category field is searched for and an NRT service is identified (S2304). The receiver may identify a desired NRT service using an MH_service_id field.

The receiver reads and stores session information such as an IP address and a UDP port number for a component corresponding to the NRT service in the SMT (S2305).

The receiver processes component_descriptor( ) of the NRT service and reads information about a FLUTE session (S2306).

The receiver processes component_descriptor with respect to the component (M/H component data with type 38) and checks a TSI value of the component. The receiver joins in a FLUTE file delivery session using the acquired information, reads an FDT, and acquires content_id for the selected content item (S2307).

The content_id acquired in step S2307 and the content identifier acquired in step S2302 are mapped (S2308). The mapping is performed because the content_id acquired in step S2307 and the content identifier acquired in step S2302 are defined in different formats. The mapping process may, for example, refer to FIGS. 20 to 22.

If the content_id acquired in step S2307 and the content identifier acquired in step S2302 are matched to each other as the mapping result, a file in the selected content item is downloaded (S2309).

Figure 24:
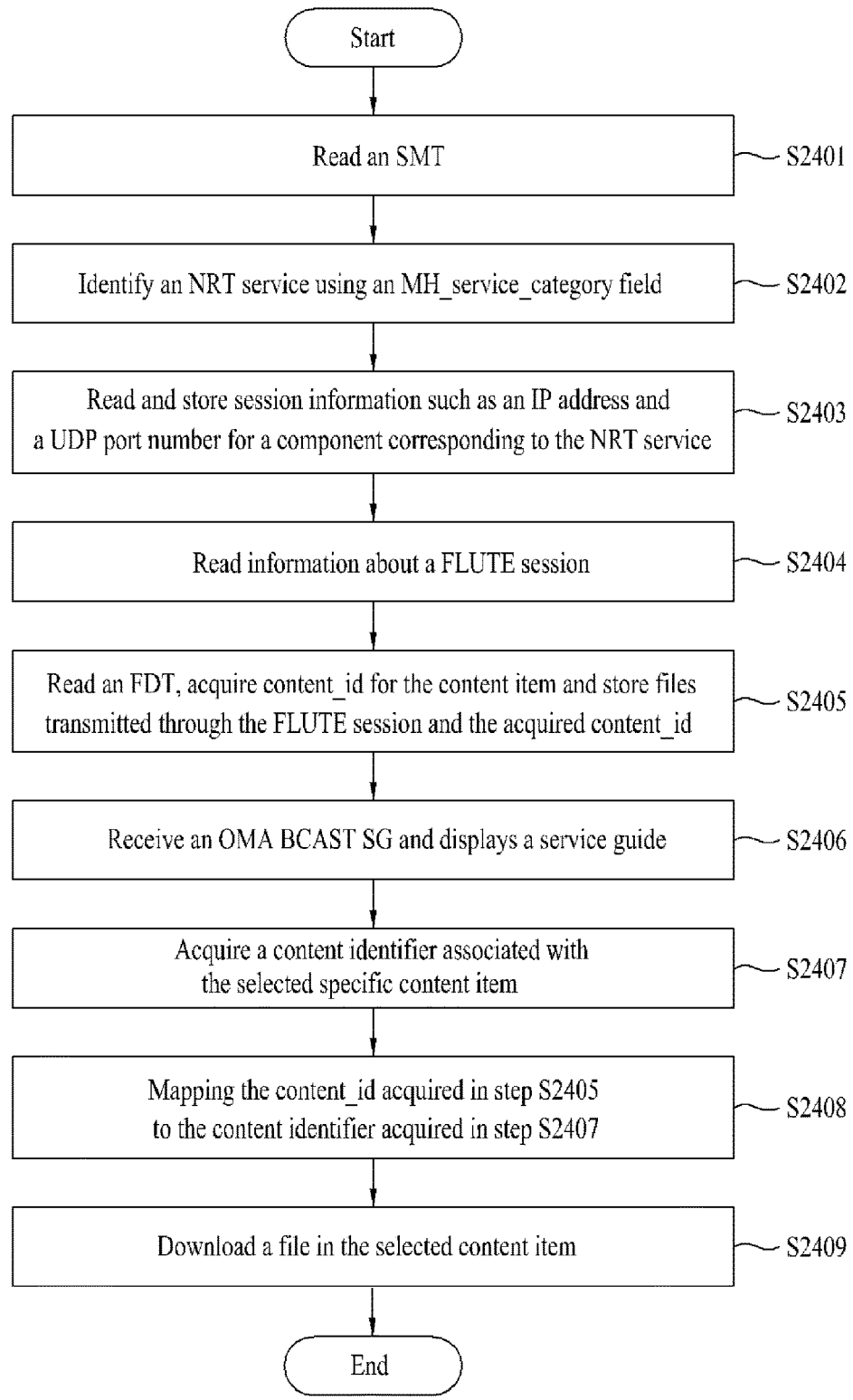
FIG. 24 is a flowchart illustrating a method of providing an NRT service according to another embodiment of the present invention.

FIG. 24 is a flowchart illustrating a method of providing an NRT service according to another embodiment of the present invention.

The receiver processes and reads an SMT of signaling information in order to receive a content item in an NRT service (S2401).

If an M/H service contains a signal or multiple M/H NRT services, an MH_service_category field is searched for and the NRT service is identified (S2402). The receiver may identify a desired NRT service using an MH_service_id field.

The receiver reads and stores session information such as an IP address and a UDP port number for a component corresponding to the NRT service in the SMT (S2403).

The receiver processes component_descriptor of the component and reads information about a FLUTE session (S2404).

The receiver processes component_descriptor with respect to the component (M/H component data with type 38) and checks a TSI value of the component. The receiver joins in a FLUTE file delivery session using the acquired information, reads an FDT, and acquires content_id for the content item in the NRT service. Files transmitted through the FLUTE session and the acquired content_id are stored (S2405).

The receiver receives an OMA BCAST SG, processes the received OMA BCAST SG, and configures and displays a service guide (S2406).

When a user or the like selects a specific content item in at least one mobile NRT service from the displayed service guide, a content identifier associated with the selected specific content item is acquired (S2407).

The content_id acquired in step S2405 and the content identifier acquired in step S2407 are mapped (S2408). The mapping is performed because the content_id acquired in step S2405 and the content identifier acquired in step S2407 are defined in different formats. The mapping process may, for example, refer to FIGS. 20 to 22.

If the content_id acquired in step S2405 and the content identifier acquired in step S2407 are matched to each other as the mapping result, a file in the selected content item is downloaded (S2409).

In the embodiment of the service providing method of FIG. 23, the SMT is processed first, the FLUTE session for providing the NRT service is accessed, the content items in the service are received and stored, and a content item, which is desired by the user, from among the stored content items is reproduced using the OMA-BCAST SG.

In contrast, in the embodiment of the service providing method of FIG. 24, the OMA-BCAST SG is processed first, the service guide is provided, the SMT is processed when the user or the like selects the specific content item, the FLUTE session in which the selected content item is transmitted is accessed, and the content is received, stored and reproduced.

The service providing method of FIG. 23 and the service providing method of FIG. 24 are different from each other as described above. In FIG. 23, since all associated content items are received and stored, the range of choice of the user broadens. Since the desired content is already stored, the desired content can be rapidly reproduced, but there is a limitation in terms of storage space. Since all the content items in the service are received, unnecessary content items are also received and thus system efficiency may deteriorate. In FIG. 24, since only the desired content item is received, system efficiency can be improved. However, if the user wants another content item, since the service guide is provided again and the selected content item is received, the time consumed for reproducing the desired item may be increased.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of receiving a broadcast signal in a receiver, the method comprising:
   receiving the broadcast signal including Internet Protocol (IP)/User Datagram Protocol (UDP) packets carrying data for a service and singling data including first signaling data and second signaling data,
   wherein the service is a file-based broadcast service,
   wherein the file-based broadcast service includes one or more content items, wherein the one or more content items are delivered via a file transmission session over the IP/UDP packets, wherein the first signaling data includes service category information for identifying that a category of the service is the file-based broadcast service, service identification information for identifying the file-based broadcast service, status information for identifying whether the file-based broadcast service is hidden, and short name information of the file-based broadcast service, and wherein the second signaling data includes information for a start time of the file transmission session and an end time of the file transmission session;

demodulating the received broadcast signal;

de-capsulating the IP/UDP packets in the demodulated broadcast signal; and processing the one or more content items in the de-capsulated IP/UDP packets based on the second signaling data.

2. An apparatus for receiving a broadcast signal, the apparatus comprising:

a tuner that receives the broadcast signal including Internet Protocol (IP)/User Datagram Protocol (UDP) packets carrying data for a service and singling data, the signaling data including first signaling data and second signaling data, wherein the service is a file-based broadcast service, wherein the file-based broadcast service includes one or more content items, wherein the one or more content items is delivered via a file transmission session over the IP/UDP packets, wherein the first signaling data includes service category information for identifying that a category of the service is the file-based broadcast service, service identification information for identifying the file-based broadcast service, status information for identifying whether the file-based broadcast service is hidden, and short name information of the file-based broadcast service, and wherein the second signaling data includes information for a start time of the file transmission session and an end time of the file transmission session;

a demodulator that demodulates the received broadcast signal;

a parser that de-capsuates the IP/UDP packets in the demodulated broadcast signal; and an engine that process the one or more content items in the de-capsulated IP/UDP packets based on the second signaling data.

* * * * *